(12) United States Patent
Kato et al.

(10) Patent No.: US 8,142,277 B2
(45) Date of Patent: Mar. 27, 2012

(54) PROGRAM, GAME SYSTEM, AND MOVEMENT CONTROL METHOD FOR ASSISTING A USER TO POSITION A GAME OBJECT

(75) Inventors: Masanori Kato, Yokohama (JP); Masashi Koyanagi, Tokyo (JP)

(73) Assignee: Namco Bandai Games Inc., Tokyo (JP)

( * ) Notice: Subject to any disclaimer, the term of this patent is extended or adjusted under 35 U.S.C. 154(b) by 480 days.

(21) Appl. No.: 12/406,438

(22) Filed: Mar. 18, 2009

(65) Prior Publication Data
US 2009/0247250 A1 Oct. 1, 2009

(30) Foreign Application Priority Data
Mar. 31, 2008 (JP) .................................. 2008-089901

(51) Int. Cl.
*A63F 9/24* (2006.01)
(52) U.S. Cl. ................................. 463/23; 463/2; 463/49
(58) Field of Classification Search .......................... None
See application file for complete search history.

(56) References Cited

U.S. PATENT DOCUMENTS

| 6,409,604 | B1 * | 6/2002 | Matsuno | 463/43 |
| 6,504,539 | B1 * | 1/2003 | Hiraki | 345/427 |
| 7,837,552 | B2 * | 11/2010 | Sumi et al. | 463/23 |
| 7,963,833 | B2 * | 6/2011 | Novak et al. | 463/2 |
| 2002/0103031 | A1 * | 8/2002 | Neveu et al. | 463/49 |
| 2004/0166914 | A1 * | 8/2004 | Ishihata et al. | 463/2 |
| 2006/0084509 | A1 * | 4/2006 | Novak et al. | 463/49 |
| 2009/0181736 | A1 * | 7/2009 | Haigh-Hutchinson et al. | 463/2 |
| 2009/0325660 | A1 * | 12/2009 | Langridge | 463/2 |

FOREIGN PATENT DOCUMENTS
JP 2000-140417 5/2000

OTHER PUBLICATIONS

YouTube Video snapshots "[Sega Saturn] Virtual on moves and strategies", http://www.youtube.com/watch?v=meK6dOrbTyQ, Posted Nov. 22, 2009, Retrieved on Aug. 24, 2011.*
Gamespot Virtual-On Marz release information, http://www.gamespot.com/ps2/action/virtualonmarz/similar.html?mode=versions, Retrieved on Aug. 24 2011.*
Gamespot Virtual-On Marz review, http://www.gamespot.com/ps2/action/virtualonmarz/review.html, Posted on Oct. 20, 2003, Retrieved on Aug. 24, 2011.*
Virtual-On Marz game manual, http://replacementdocs.com/download.php?view.3287, Posted on Aug. 24, 2005, Retrieved on Aug. 24, 2011.*

* cited by examiner

*Primary Examiner* — Evan Pert
*Assistant Examiner* — Andres Munoz
(74) *Attorney, Agent, or Firm* — Oliff & Berridge, PLC

(57) ABSTRACT

A game system receives special command input information input by the player when a moving object and a target have a predetermined positional relationship, and moves the moving object to a position at which bullets fired from the moving object can hit the target irrespective of movement input information when the game system has received the special command input information.

7 Claims, 20 Drawing Sheets

FIG. 15A
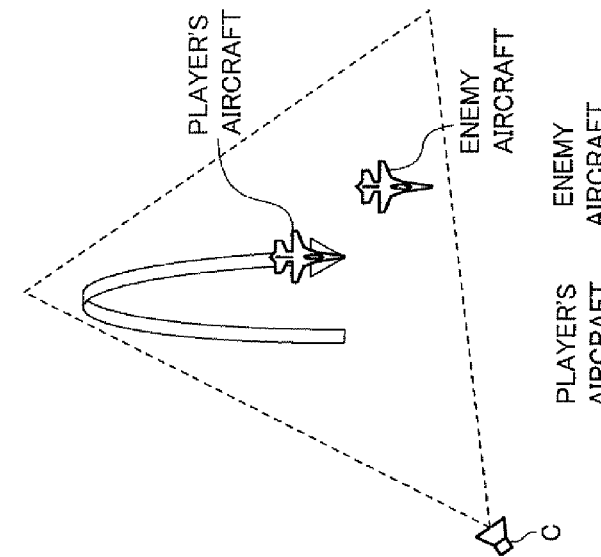
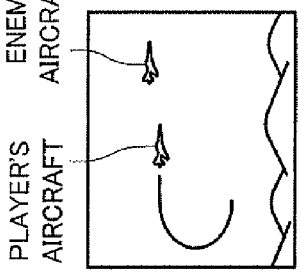
FIG. 15B
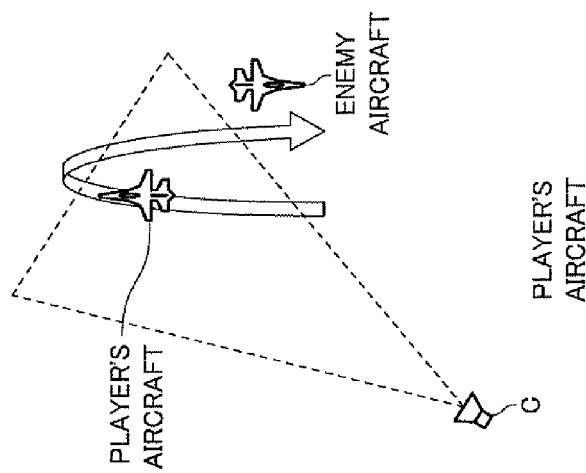
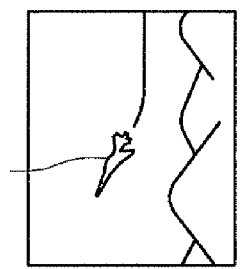
FIG. 15C
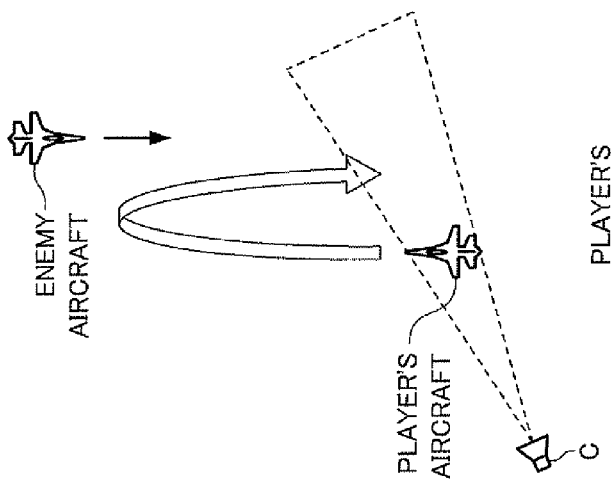
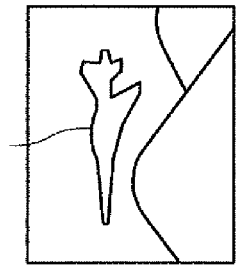

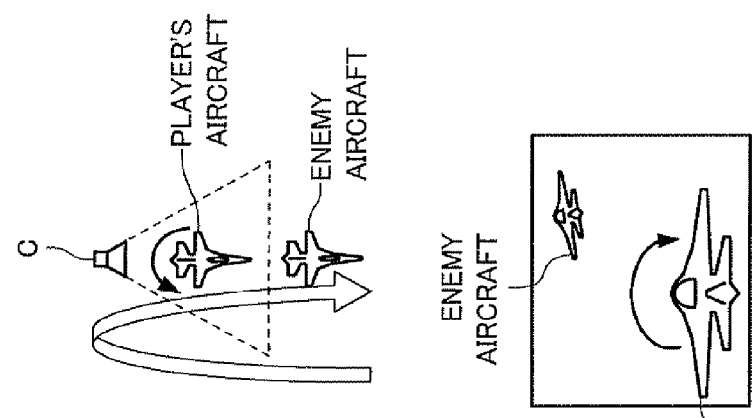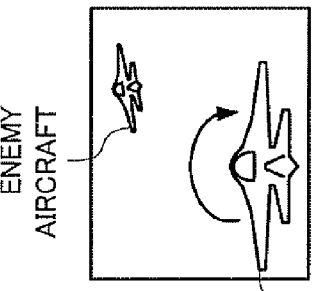
FIG. 16A
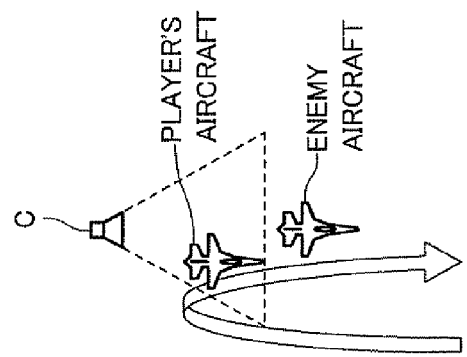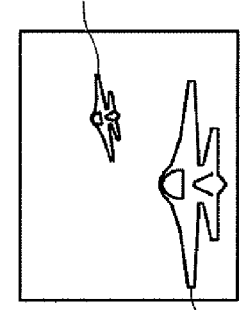
FIG. 16B
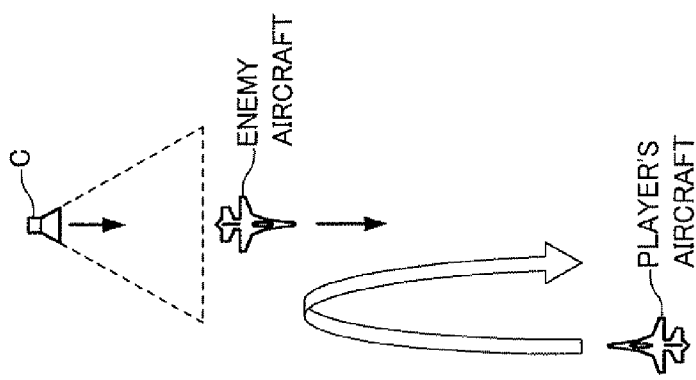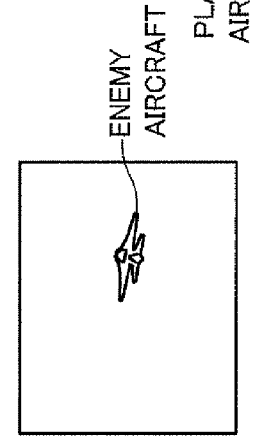
FIG. 16C

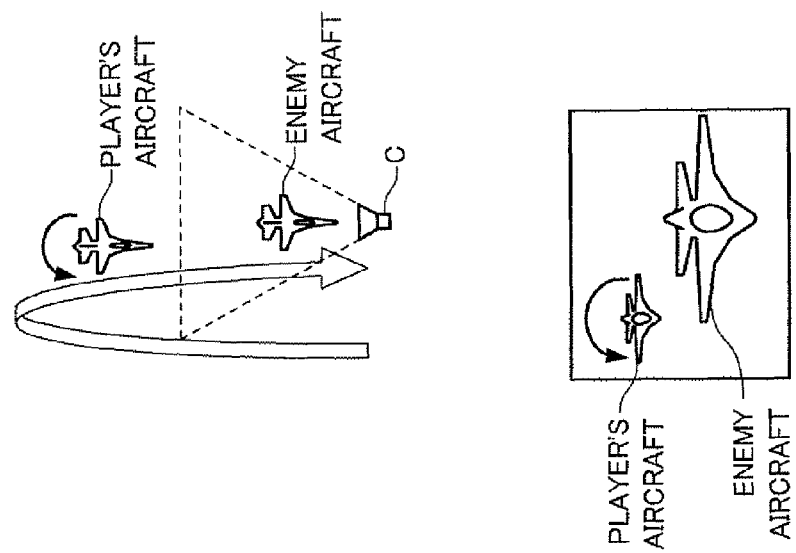
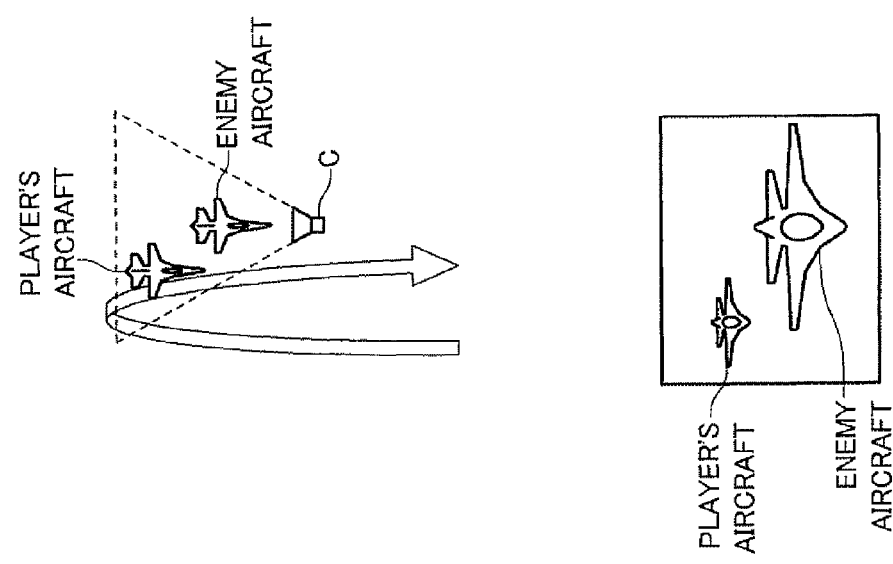
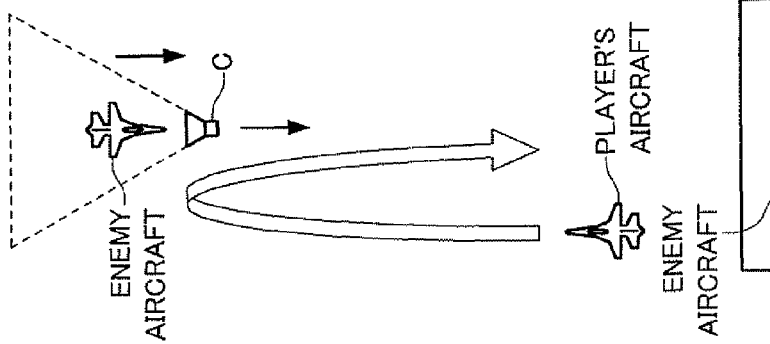

PROGRAM, GAME SYSTEM, AND MOVEMENT CONTROL METHOD FOR ASSISTING A USER TO POSITION A GAME OBJECT

Japanese Patent Application No. 2008-89901, filed on Mar. 31, 2008, is hereby incorporated by reference in its entirety.

BACKGROUND OF THE INVENTION

The present invention relates to a program, a game system, and a movement control method.

A flight shooting game that allows the player to move a player's aircraft in an object space and shoot an enemy aircraft by performing an input operation has been popular (see JP-A-2000-140417).

When the player attacks the enemy aircraft using a machine gun (cannon) provided corresponding to the axis of the player's aircraft, it is effective to move the player's aircraft to a position behind the enemy aircraft so that bullets fired from the machine gun easily hit the enemy aircraft.

However, it is difficult for an inexperienced player to perform an input operation that moves the player's aircraft to a position at which bullets fired from the player's aircraft hit the enemy aircraft.

SUMMARY

According to a first aspect of the invention, there is provided a program that is stored in a computer-readable information storage medium and implements a shooting game in which a moving object shoots a target in an object space, the program causing a computer to function as:

a movement processing section that moves the moving object based on movement input information input by a player;

a reception section that receives special command input information input by the player when the moving object and the target have a predetermined positional relationship; and a game calculation section that causes the moving object to fire a bullet based on shooting input information input by the player, determines whether or not the fired bullet has hit the target, and performs game calculations based on the determination result, the movement processing section moving the moving object to a position at which the bullet fired from the moving object can hit the target irrespective of the movement input information when the reception section has received the special command input information.

According to a second aspect of the invention, there is provided a game system that implements a shooting game in which a moving object shoots a target in an object space, the game system comprising:

a movement processing section that moves the moving object based on movement input information input by a player;

a reception section that receives special command input information input by the player when the moving object and the target have a predetermined positional relationship; and a game calculation section that causes the moving object to fire a bullet based on shooting input information input by the player, determines whether or not the fired bullet has hit the target, and performs game calculations based on the determination result, the movement processing section moving the moving object to a position at which the bullet fired from the moving object can hit the target irrespective of the movement input information when the reception section has received the special command input information.

According to a third aspect of the invention, there is provided a movement control method that is used in a shooting game in which a moving object shoots a target in an object space, the movement control method comprising:

moving the moving object based on movement input information input by a player;

receiving special command input information input by the player when the moving object and the target have a predetermined positional relationship;

causing the moving object to fire a bullet based on shooting input information input by the player, determining whether or not the fired bullet has hit the target, and performing game calculations based on the determination result; and moving the moving object to a position at which the bullet fired from the moving object can hit the target irrespective of the movement input information when the special command input information has been received.

BRIEF DESCRIPTION OF THE SEVERAL VIEWS OF THE DRAWING

FIGS. 15A to 15C illustrate control of a virtual camera.

FIGS. 16A to 16C illustrate control of a virtual camera.

FIGS. 17A to 17C illustrate control of a virtual camera.

DETAILED DESCRIPTION OF THE EMBODIMENT

Figure 1:
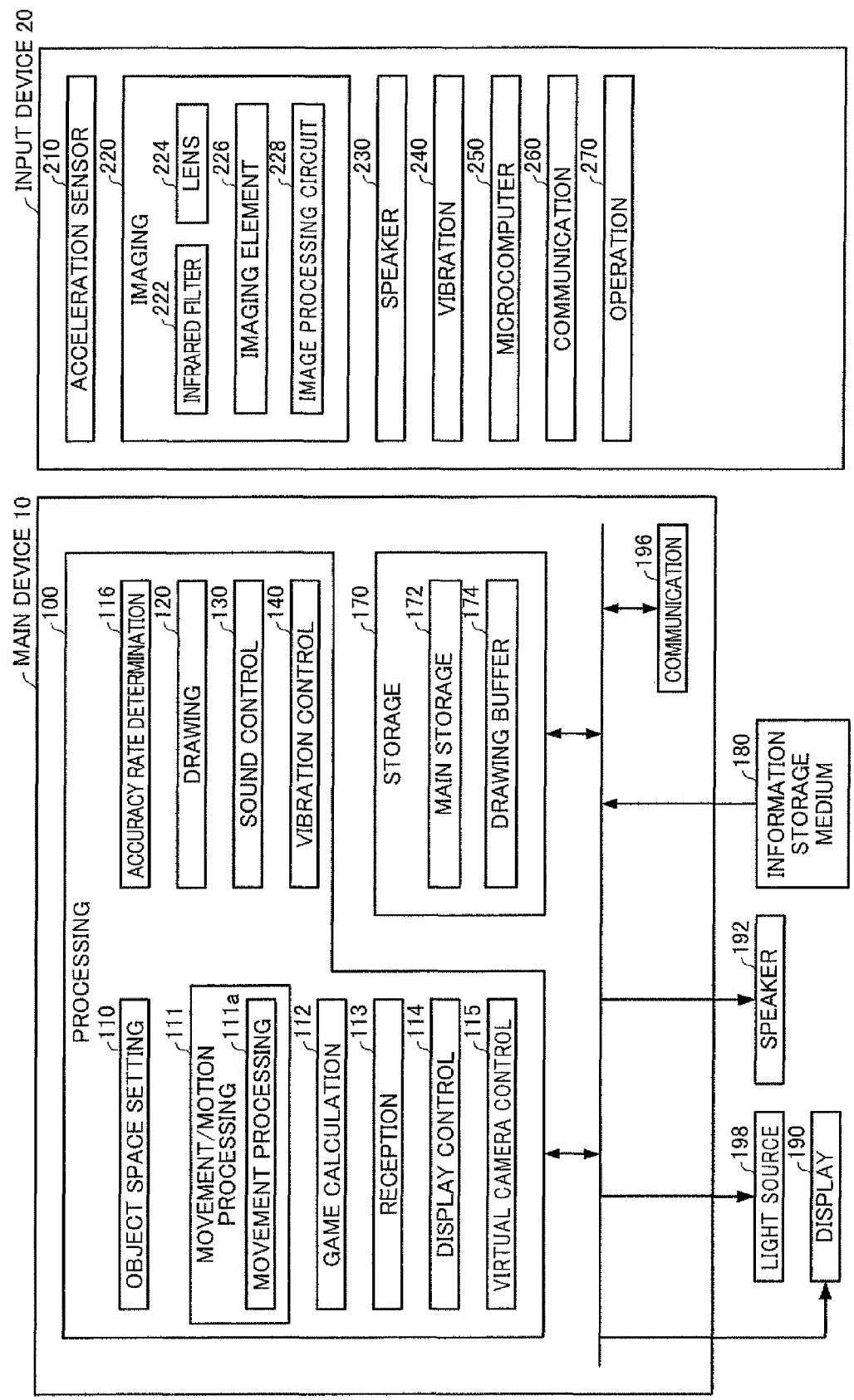
FIG. 1 is a functional block diagram illustrating a game system according to one embodiment of the invention.

The invention may provide a program, a game system, and a movement control method for a shooting game, all of which enable an inexperienced player to easily aim at the target.

(1) According to one embodiment of the invention, there is provided a program that is stored in a computer-readable information storage medium and implements a shooting game in which a moving object shoots a target in an object space, the program causing a computer to function as:

a movement processing section that moves the moving object based on movement input information input by a player;

a reception section that receives special command input information input by the player when the moving object and the target have a predetermined positional relationship; and a game calculation section that causes the moving object to fire a bullet based on shooting input information input by the player, determines whether or not the fired bullet has hit the target, and performs game calculations based on the determination result, the movement processing section moving the moving object to a position at which the bullet fired from the moving object can hit the target irrespective of the movement input information when the reception section has received the special command input information, According to the above embodiment, a movement input operation that moves the moving object to a position at which the moving object can easily aim at the target can be simplified.

(2) In the above-described program, the reception section may receive the special command input information when the moving object is positioned within a specific area that has been set in the object space based on a position of the target.

(3) The above-described program may cause a computer to further function as:

a drawing section that generates a field-of-view image viewed from a virtual camera in the object space; and a display control section that displays the field-of-view image, and displays a simplified image that shows a relationship between a position of the moving object and the specific area in a display region differing from a display region of the field-of-view image.

According to the above embodiment, since an simplified image of the relationship between the position of the moving object and the specific area is displayed, the player can perform an appropriate input operation.

(4) The above-described program may cause a computer to further function as:

an accuracy rate determination section that determines an accuracy rate when a plurality of bullets have been fired based on a period of time in which the moving object and the target have maintained the predetermined positional relationship until the reception section receives the special command input information, wherein the movement processing section determines the position to which the moving object is moved based on the determined accuracy rate when the reception section has received the special command input information.

According to the above embodiment, the period of time in which the moving object and the target have maintained the predetermined positional relationship until the player inputs the special command can be reflected in the accuracy rate.

(5) The above-described program may cause a computer to further function as:

an accuracy rate determination section that determines an accuracy rate when a plurality of bullets have been fired based on the positional relationship between the moving object and the target when the reception section receives the special command input information, wherein the movement processing section determines the position to which the moving object is moved based on the determined accuracy rate when the reception section has received the special command input information.

According to the above embodiment, the positional relationship between the moving object and the target when the player has input the special command can be reflected in the accuracy rate.

(6) The above-described program may cause a computer to further function as:

a virtual camera control section that controls a virtual camera in the object space; and a drawing section that generates a field-of-view image viewed from the virtual camera in the object space, wherein the movement processing section calculates a moving path of the moving object based on the special command input information when the reception section has received the special command input information; and wherein the virtual camera control section controls at least one of a position, a direction, and an angle of view of the virtual camera based on the moving path of the moving object.

According to the above embodiment, the field-of-view image corresponding to the moving path of the moving object can be generated.

(7) According to one embodiment of the invention, there is provided a game system that implements a shooting game in which a moving object shoots a target in an object space, the game system comprising:

a movement processing section that moves the moving object based on movement input information input by a player;

a reception section that receives special command input information input by the player when the moving object and the target have a predetermined positional relationship; and a game calculation section that causes the moving object to fire a bullet based on shooting input information input by the player, determines whether or not the fired bullet has hit the target, and performs game calculations based on the determination result, the movement processing section moving the moving object to a position at which the bullet fired from the moving object can hit the target irrespective of the movement input information when the reception section has received the special command input information.

(8) According to one embodiment of the invention, there is provided a movement control method that is used in a shooting game in which a moving object shoots a target in an object space, the movement control method comprising:

moving the moving object based on movement input information input by a player;

receiving special command input information input by the player when the moving object and the target have a predetermined positional relationship;

causing the moving object to fire a bullet based on shooting input information input by the player, determining whether or not the fired bullet has hit the target, and performing game calculations based on the determination result; and moving the moving object to a position at which the bullet fired from the moving object can hit the target irrespective of the movement input information when the special command input information has been received.

Embodiments of the invention will now be described below. Note that the embodiments described below do not unduly limit the scope of the invention as stated in the claims. Also, not all the elements described below should be taken as essential requirements of the invention.

1. Configuration

FIG. 1 is a functional block diagram illustrating a game system according to one embodiment of the invention. Note that the game system according to this embodiment need not necessarily include all of the elements in FIG. 1. The game system according to this embodiment may have a configuration in which some of the elements are omitted.

The game system according to this embodiment includes a main device 10, an input device 20, an information storage medium 180, a display section (display device) 190, a speaker 192, and a light source 198.

The input device 20 includes an acceleration sensor 210, an imaging section 220, a speaker 230, a vibration section 240, a microcomputer 250, a communication section 260, and an operation section 270.

The acceleration sensor 210 detects triaxial (X axis, Y axis, and Z axis) accelerations. Specifically, the acceleration sensor 210 detects accelerations in the vertical direction, the lateral direction, and the back and forth direction. The acceleration sensor 210 detects accelerations every 5 msec, and the accelerations detected by the acceleration sensor 210 are transmitted to the main device 10 through the communication section 260. The acceleration sensor 210 may detect uniaxial, biaxial, or hexaxial accelerations.

The imaging section 220 includes an infrared filter 222, a lens 224, an imaging element (image sensor) 226, and an image processing circuit 228. The infrared filter 222 is disposed in front of the input device 20, and allows only infrared radiation to pass through from light incident from the light source 198 disposed corresponding to the display section 190. The lens 224 condenses the infrared radiation that has passed through the infrared filter 222, and emits the infrared radiation to the imaging element 226. The imaging element 226 is a solid-state imaging element such as a CMOS sensor or a CCD. The imaging element 226 images infrared radiation condensed by the lens 224 to generate a captured image. The image processing circuit 228 processes the captured image generated by the imaging device 226. For example, the image processing circuit 228 processes the captured image generated by the imaging device 226 to detect a high luminance portion, and detects light source position information (specified position) in the captured image. When a plurality of light sources are provided, the image processing circuit 228 detects a plurality of pieces of position information in the captured image. The image processing circuit 228 may detect a plurality of pieces of position information in the captured image by utilizing a plurality of light sources, and calculate the rotational angle (inclination) of the detected position information with respect to a reference axis to calculate the inclination of the input device 20 with respect to the light sources. The position information detected in the captured image is transmitted to the main device 10 through the communication section 260.

The speaker 230 outputs sound acquired from the main device 10 through the communication section 260.

The vibration section (vibrator) 240 receives a vibration signal transmitted from the main device 10, and operates based on the vibration signal.

The microcomputer 250 transmits an input signal output from the operation section 270 and the accelerations detected by the acceleration sensor 210 to the main device 10 through the communication section 260, or transmits the position information detected by the imaging section 220 to the main device 10 through the communication section 260. The microcomputer 250 outputs sound or operates the vibrator based on data from received from the main device 10.

The communication section 260 includes an antenna and a wireless module, and exchanges data with the main device 10 via wireless communication using the Bluetooth (registered trademark) technology, for example. The communication section 260 according to this embodiment transmits the accelerations detected by the acceleration sensor 210, the position information detected by the imaging section 220, and the like to the main device 10 alternately at intervals of 4 msec and 6 msec. The communication section 260 may be connected to the main device 10 via a communication cable, and may exchange information with the main device 10 via the communication cable.

The operation section 270 includes operating sections such as a direction key (arrow key), buttons (e.g., button A and button B), and a control stick (analog key) that allows the player perform a direction input, and outputs an input signal based on an input operation of the player. The operation signal is transmitted to the main device 10 through the communication section 260.

The input device 20 may include a gyrosensor that detects an angular velocity that changes due to an input operation performed by the player.

The controller 20 may include a pressure sensor. The pressure sensor detects a pressure that occurs due to an input operation of the player. For example, the pressure sensor detects a pressure that occurs due to the weight of the player or force applied by the player. The input device 20 may include a plurality of pressure sensors, and each of the pressure sensors may detect a pressure value.

The input device 20 according to this embodiment also encompasses the main device 10 (game device or portable game device) that is integrated with the input device 20, a portable telephone, and the like.

The main device 10 according to this embodiment is described below. The main device 10 according to this embodiment includes a storage section 170, a processing section 100, and a communication section 196.

The storage section 170 serves as a work area for the processing section 100, the communication section 196, and the like. The function of the storage section 170 may be implemented by hardware such as a RAM (VRAM).

The storage section 170 according to this embodiment includes a main storage section 172 and a drawing buffer 174. The main storage section 172 serves as a work area for the processing section 100, the communication section 196, and the like. The function of the storage section 170 may be implemented by hardware such as a RAM (VRAM). The drawing buffer 174 stores an image generated by a drawing section 120.

The processing section 100 performs various processes according to this embodiment based on a program (data) stored in (read from) the information storage medium 180. Specifically, the information storage medium 180 stores a program that causes a computer to function as each section according to this embodiment (i.e., a program that causes a computer to perform the process of each section). The information storage medium 180 includes a memory card that stores a player's personal data, game save data, and the like.

The communication section 196 can communicate with another main device 10 (game device) through a network (Internet). The function of the communication section 196 may be implemented by hardware such as a processor, a communication ASIC, or a network interface card, a program, or the like. The communication section 196 can perform cable communication and wireless communication.

The communication section 196 includes an antenna and a wireless module, and exchanges data with the input device 20 through the communication section 260 of the input device 20 using the Bluetooth (registered trademark) technology. For example, the communication section 196 transmits sound data and a vibration signal to the input device 20, and receives the input signal output from the operation section 270, accelerations detected by the acceleration sensor 210, and information detected by the imaging section 220 from the input device 20 alternately at intervals of 4 msec and 6 msec.

A program (data) that causes a computer to function as each section according to this embodiment may be distributed to the information storage medium 180 (or the storage section 170) from a storage section or an information storage medium included in a server through a network. Use of the information storage medium included in the server is also included within the scope of the invention.

The processing section 100 (processor) performs a game calculation process, an image generation process, and a sound control process based on information received from the input device 20, a program loaded into the storage section 170 from the information storage medium 180, and the like.

The processing section 100 according to this embodiment includes an object space setting section 110, a movement/motion processing section 111, a game calculation section 112, a reception section 113, a display control section 114, a virtual camera control section 115, an accuracy rate determination section 116, a drawing section 120, a sound control section 130, and a vibration control section 140.

The object space setting section 110 disposes objects (e.g., moving object, target, player's aircraft, enemy aircraft, and bullet) and various other objects (objects formed by a primitive such as a polygon, free-form surface, or subdivision surface) that indicate display objects such as a character, a building, a stadium, a car, a tree, a pillar, a wall, or a map (topography) in an object space. For example, the object space setting section 110 determines the position and the rotational angle of an object in a world coordinate system (the rotational angle is synonymous with orientation or direction; e.g., the rotational angle when the object is rotated clockwise around each of the X, Y, and Z axes in the world coordinate system), and disposes the object at the determined position (X, Y, Z) and the determined rotational angle (rotational angles around the X, Y, and Z axes).

The movement/motion processing section 111 calculates the movement/motion of an object. Specifically, the movement/motion processing section 111 causes an object to move in the object space or to make a motion (animation) based on input information input by the player using the input device 20, a program (movement/motion algorithm), various types of data (motion data), and the like. More specifically, the movement/motion processing section 111 sequentially calculates object movement information (position, rotational angle, speed, or acceleration) and object motion information (position or rotational angle of each part that forms the object) every frame (1/60th of a second). The term "frame" used herein refers to a time unit for the object movement/motion process and the image generation process.

A movement processing section 111a according to this embodiment moves a moving object based on movement input information input by the player. In this embodiment, the movement input information input by the player corresponds to accelerations detected by the acceleration sensor. In this embodiment, the movement processing section 111a calculates an inclination value based on accelerations detected by the acceleration sensor, determines the moving direction and the moving speed of the moving object based on the inclination value, and then moves the moving object.

When special command input information has been received, the movement processing section 111a moves the moving object to a position at which bullets fired from the moving object can hit the target irrespective of the movement input information. In this embodiment, the special command input information corresponds to a first input signal (e.g., an input signal input using the button A) from the operation section 270.

The movement processing section 111a may determine the position to which the moving object is moved based on an accuracy rate when the special command input information has been received.

When the special command input information has been received, the movement processing section 111a may calculate the moving path (maneuver flight path) of the moving object based on the special command.

The game calculation section 112 performs various game calculation processes. For example, the game calculation section 112 starts the game when game start conditions have been satisfied, proceeds with the game, determines whether or not clear conditions corresponding to each game stage have been satisfied, finishes the game when game finish conditions have been satisfied, and performs an ending process when the final stage has been cleared.

The game calculation section 112 according to this embodiment causes the moving object to fire bullets based on shooting input information input by the player, determines whether or not the fired bullets have hit the target, and performs game calculations based on the determination result. In this embodiment, the shooting input information corresponds to a second input signal (e.g., an input signal input using the button B) from the operation section 270. The game calculation section 112 determines whether or not the bullets have hit the target by checking whether or not a predetermined hit area of the bullet has hit a predetermined hit area of the target (i.e., hit check).

The reception section 113 receives the input information input by the player. The reception section 113 according to this embodiment receives the special command input information input by the player when the moving object and the target have a predetermined positional relationship. The reception section 113 receives the special command input information when the moving object is positioned within a specific area that has been set in the object space based on the position of the target.

The display control section 114 displays a field-of-view image and displays a simplified image (radar map) that shows the relationship between the position of the moving object and a specific area in a display region differing from the display region of the field-of-view image.

The virtual camera control section 115 controls a virtual camera (viewpoint) for generating an image viewed from a given (arbitrary) viewpoint in the object space. Specifically, the virtual camera control section 115 controls the position (X, Y, Z) or the rotational angle (e.g., the rotational angle of the virtual camera when the virtual camera is rotated clockwise around each of the X, Y, and Z axes) of the virtual camera in the world coordinate system.

The virtual camera control section 115 according to this embodiment controls at least one of the position, the direction, and the angle of view of the virtual camera based on the moving path of the moving object.

The accuracy rate determination section 116 determines the accuracy rate when a plurality of bullets have been fired based on the positional relationship between the moving object and the target when the special command input information is received.

The accuracy rate determination section 116 determines the accuracy rate when a plurality of bullets have been fired based on a period of time in which the moving object and the target have maintained a predetermined positional relationship until the special command input information is received.

The drawing section 120 performs a drawing process based on the results of various processes (game calculation process) performed by the processing section 100 to generate an image (e.g., field-of-view image and radar map), and outputs the image to the display section 190.

When generating a three-dimensional game image, the drawing section 120 receives display object data (object data or model data) including vertex data (e.g., vertex position coordinates, texture coordinates, color data, normal vector, or alpha value) relating to each vertex that defines the display object (object or model), and performs a vertex process based on the vertex data included in the display object data. When performing the vertex process, the drawing section 120 may perform a vertex generation process (tessellation, curved surface division, or polygon division) for dividing the polygon, if necessary. In the vertex process, the drawing section 120 performs a vertex movement process and a geometric process such as coordinate transformation (world coordinate transformation or camera coordinate transformation), clipping, perspective transformation, or a light source process, and changes (updates or adjusts) the vertex data relating to the vertices that form the display object based on the processing results. The drawing section 120 performs a rasterization process (scan conversion) based on the vertex data changed by the vertex process so that the surface of the polygon (primitive) is associated with pixels. The drawing section 120 then performs a pixel process (fragment process) that draws pixels that form the image (fragments that form the display screen). In the pixel process, the drawing section 120 determines the drawing color of each pixel that forms the image by performing various processes such as a texture reading (texture mapping) process, a color data setting/change process, a translucent blending process, and an anti-aliasing process, and outputs (draws) the drawing color of the object subjected to perspective transformation to the drawing buffer 174 (i.e., a buffer that can store image information corresponding to each pixel; VRAM or rendering target). Specifically, the pixel process includes a per-pixel process that sets or changes the image information (e.g., color, normal, luminance, and alpha value) corresponding to each pixel. An image viewed from the virtual camera (given viewpoint) set in the object space is thus generated. When a plurality of virtual cameras (viewpoints) are provided, an image may be generated so that images (divided images) viewed from the respective virtual cameras are displayed on one screen.

The vertex process and the pixel process performed by the drawing section 120 may be implemented by hardware that enables a programmable polygon (primitive) drawing process (i.e., programmable shader (vertex shader and pixel shader)) based on a shader program written using a shading language. The programmable shader enables a programmable per-vertex process and per-pixel process to increase the degree of freedom relating to the drawing process so that the representation capability is significantly improved as compared with a fixed hardware drawing process.

The drawing section 120 performs a geometric process, a texture mapping process, a hidden surface removal process, an alpha blending process, and the like when drawing the display object.

In the geometric process, the drawing section 120 performs a coordinate transformation process, a clipping process, a perspective transformation process, a light source calculation process, and the like on the display object. The display object data (e.g., display object's vertex position coordinates, texture coordinates, color data (luminance data), normal vector, or alpha value) after the geometric process (after perspective transformation) is stored in the main storage section 172.

The term "texture mapping process" refers to a process that maps a texture (texel value) stored in the storage section 170 on the display object. Specifically, the drawing section 120 reads a texture (surface properties such as color (RGB) and alpha value) from the storage section 170 using the texture coordinates set (assigned) corresponding to the vertices of the display object, for example. The drawing section 120 then maps the texture (i.e., two-dimensional image) on the display object. In this case, the drawing section 120 performs a pixel-texel association process, a bilinear interpolation process (texel interpolation process), and the like.

The drawing section 120 may perform a hidden surface removal process by a Z buffer method (depth comparison method or Z test) using a Z buffer (depth buffer) that stores the Z value (depth information) of the drawing pixel. Specifically, the drawing section 120 refers to the Z value stored in the Z buffer when drawing the drawing pixel corresponding to the primitive of the object. The drawing section 120 compares the Z value stored in the Z buffer with the Z value of the drawing pixel of the primitive. When the Z value of the drawing pixel is the Z value in front of the virtual camera (e.g., a small Z value), the drawing section 120 draws the drawing pixel and updates the Z value stored in the Z buffer with a new Z value.

The term "alpha blending process" refers to a translucent blending process (e.g., normal alpha blending, additive alpha blending, or subtractive alpha blending) based on the alpha value (A value). In the normal alpha blending process, the drawing section 120 calculates a color obtained by blending two colors by performing a linear interpolation process using the alpha value as the degree of blending.

The term "alpha value" refers to information that can be stored corresponding to each pixel (texel or dot), such as additional information other than the color information that indicates the luminance of each RGB color component. The alpha value may be used as mask information, translucency (equivalent to transparency or opacity), bump information, or the like.

The sound control section 130 causes at least one of the speaker 230 of the input device 20 and the speaker 192 to output sound stored in the storage section 170 based on the results of various processes (e.g., game calculation process) performed by the processing section 100.

The vibration control section 140 causes the vibration section 240 of the input device 20 to vibrate through the communication section 196 and the communication section 260 based on the results of various processes (e.g., game calculation process) performed by the processing section 100.

The game system according to this embodiment may be a system dedicated to a single-player mode that allows only one player to play the game, or may be a system provided with a multi-player mode that allows a plurality of players to play the game.

When a plurality of players play the game, a single main device 10 may perform the game calculation process and the image generation process based on information (e.g., the accelerations detected by the acceleration sensor 210 and the input signal output from the operation section 270) transmitted from the input device 20 used by each player, and display the generated image on the display section used by each player.

The main devices 10 respectively used by a plurality of players may be connected through a network (transmission line or communication line), and each main device 10 may perform the game calculation process and the image generation process based on information transmitted from the input device 20, and display the generated image on the display section.

The information storage medium 180 (computer-readable medium) stores a program, data, and the like. The function of the information storage medium 180 may be implemented by hardware such as an optical disk (CD or DVD), a magneto-optical disk (MO), a magnetic disk, a hard disk, a magnetic tape, or a memory (ROM).

The display section 190 outputs an image generated by the processing section 100. The function of the display section 190 may be implemented by hardware such as a CRT display, a liquid crystal display (LCD), an organic EL display (OELD), a plasma display panel (PDP), a touch panel display, or a head mount display (HMD).

The speaker 192 outputs sound reproduced by the sound control section 130. The function of the speaker 192 may be implemented by hardware such as a speaker or a headphone. The speaker 192 may be a speaker provided in the display section. For example, when a television set (home television set) is used as the display section, the speaker 192 may be a speaker provided in the television set.

The light source 198 is an LED, for example. The light source 198 is disposed corresponding to the display section 190. In this embodiment, a plurality of light sources (light source R and light source L) are provided. The light source R and the light source L are disposed at a predetermined interval.

2. Method According to This Embodiment 2.1. Outline

This embodiment relates to a program (information storage medium or game system) that implements a flight shooting game that allows the player to move an aircraft (i.e., moving object) in an object space (virtual three-dimensional space) and attack (shoot down or defeat) the target (enemy aircraft or enemy ground object) using a machine gun (cannon) installed in the aircraft based on input information input by the player.

Various flight techniques are used in such a flight shooting game. For example, the player moves the player's aircraft to a position behind the enemy aircraft (behind the enemy aircraft with respect to the travel direction of the enemy aircraft) (i.e., a position at which bullets fired from the player's aircraft can hit the enemy aircraft). Specifically, the player moves the player's aircraft so that the enemy aircraft is positioned in the range of the player's aircraft.

Figure 2:
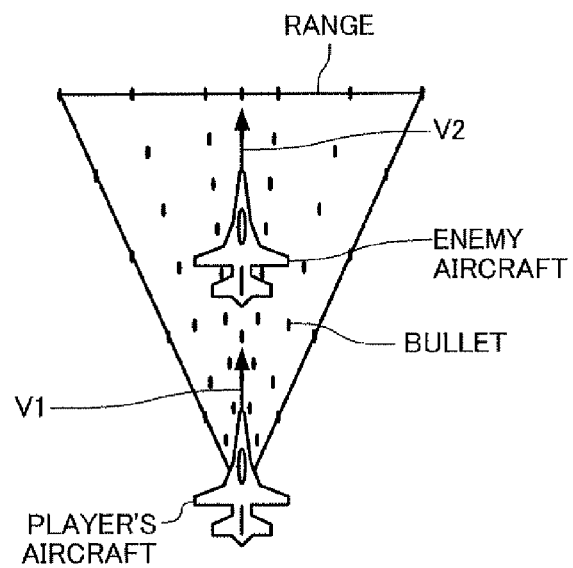
FIG. 2 illustrates an example in which an enemy aircraft is positioned within a range of a player's aircraft.

In this embodiment, the aircraft is equipped with a machine gun corresponding to the aircraft axis, and bullets fired from the machine gun travel radially in the direction of a moving vector V1 of the player's aircraft. Therefore, when the player causes the player's aircraft to attack the enemy aircraft using the machine gun, it is effective to move the player's aircraft to a position behind the enemy aircraft (i.e., the enemy aircraft is positioned within the range of the player's aircraft) so that bullets fired from the machine gun easily hit the enemy aircraft, as illustrated in FIG. 2.

However, it may be difficult for an inexperienced player to move the player's aircraft to a position behind the enemy aircraft. Specifically, since the flight shooting game requires the player to move the player's aircraft in midair, an inexperienced player may not be able to determine the positional relationship between the player's aircraft and the enemy aircraft so that it may be difficult for the player to perform an input operation that moves the player's aircraft to a position behind the enemy aircraft or an input operation that causes the player's aircraft to follow the enemy aircraft.

In this embodiment, a specific area is set around the enemy aircraft, the special command input information input by the player is received when the player's aircraft is positioned within the specific area around the enemy aircraft, and the player's aircraft is automatically moved to a position behind the enemy aircraft upon reception of the special command input information irrespective of the movement input information input by the player. The positional relationship in which the player's aircraft is positioned behind the enemy aircraft is maintained for a predetermined period. This enables an inexperienced player to attack the enemy aircraft without performing a movement input operation that moves the player's aircraft to a position behind the enemy aircraft. Therefore, the player can enjoy playing the game.

In this embodiment, the player's aircraft is moved to a position behind the enemy aircraft along a path of flight maneuver upon execution of a special command. The term "flight maneuver" refers to the movement of an aircraft such as a fighter aircraft in midair. Examples of the flight maneuver include a roll (i.e., an aircraft inclines to the right or left with respect to the travel direction), a yaw (i.e., an aircraft changes the travel direction while maintaining a horizontal state), a loop, an Immelmann turn, a Split S, and the like. According to this embodiment, since the player's aircraft is moved along a maneuver flight path, a game that attracts the player can be implemented. The details of this embodiment are described below.

2.2. Specific Area

Figure 3:
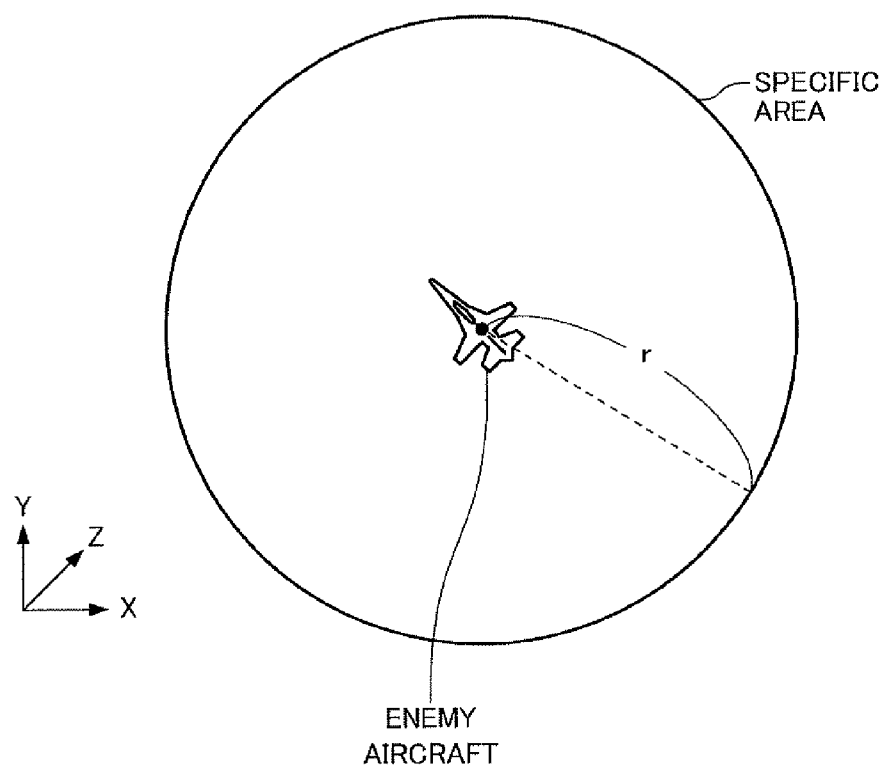
FIG 3 illustrates a specific area.

FIG. 3 illustrates an example of the specific area according to this embodiment that is set around the enemy aircraft. The specific area is set as a three-dimensional sphere (radius: r) around the enemy aircraft. Note that the specific area is a sphere that surrounds the enemy aircraft, and the position of the enemy aircraft does not necessarily coincide with the center of the sphere.

The radius r of the specific area may be changed corresponding to the type (durability and attack capability) of the enemy aircraft. The radius r of the specific area may be changed corresponding to the level (algorithm pattern) of a computer player that controls the enemy aircraft.

In this embodiment, processing of setting the specific area around an enemy aircraft that is positioned within a given distance from the player's aircraft (semi-lock-on) is performed. When a plurality of enemy aircrafts are present within a given distance from the player's aircraft, the specific area is set around the enemy aircraft that is positioned nearest to the player's aircraft. Processing of selecting an enemy aircraft around which the specific area is to be set from a plurality of enemy aircrafts present within a given distance from the player's aircraft may be performed based on input information input by the player.

Figure 4A:
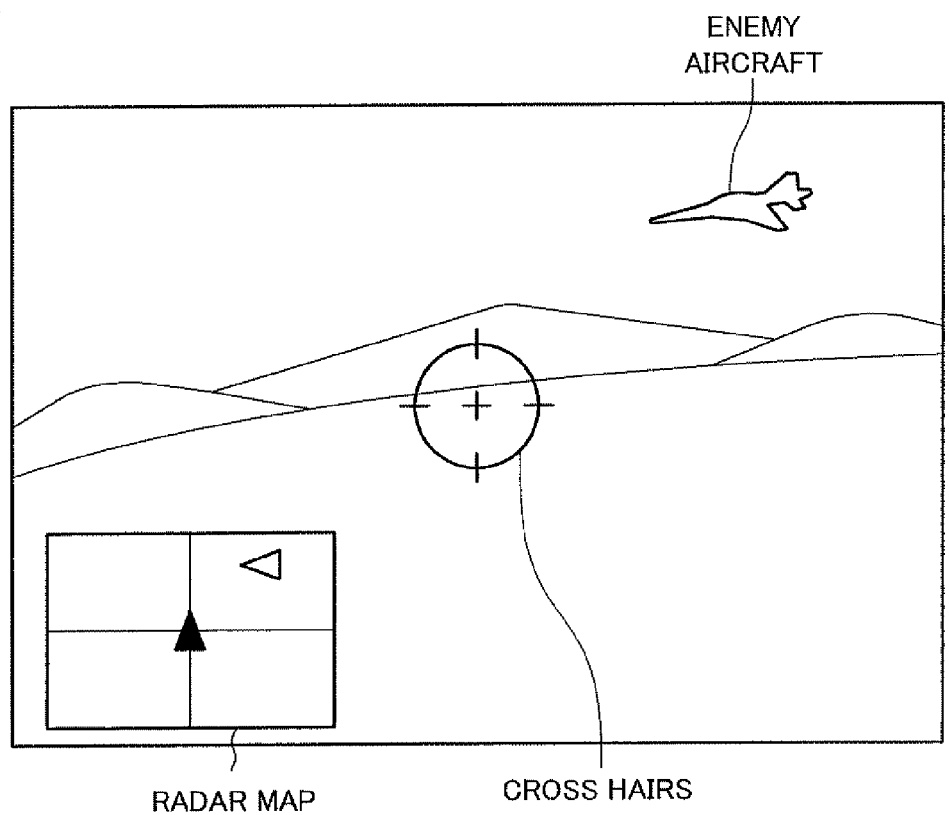
FIGS. 4A and 4B illustrate display screens according to one embodiment of the invention.
Figure 4B:
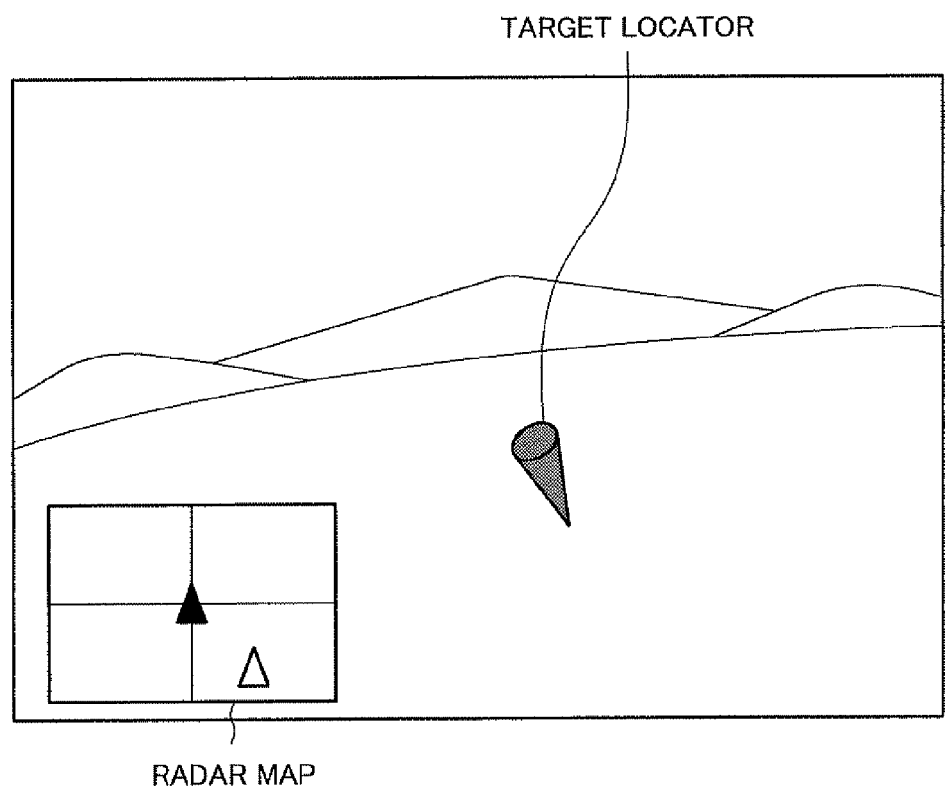

FIGS. 4A and 4B illustrate examples of a display screen (display region) according to this embodiment. In this embodiment, a field-of-view image viewed from a pilot that controls the player's aircraft is generated, and a radar map is displayed at the lower left of the display screen in a region differing from the field-of-view image, for example.

FIG. 4A illustrates an example in which the enemy aircraft is displayed in the field-of-view image. As illustrated in FIG. 4A, cross hairs may be displayed when the enemy aircraft has come into sight or is positioned within the range of the player's aircraft. FIG. 4B illustrates the case where the enemy aircraft is positioned behind the player's aircraft. When the enemy aircraft is not visible as illustrated in this figure, a target locator may be displayed to indicate the position of the enemy aircraft.

The target locator indicates the direction of the enemy aircraft (i.e., the direction of the nose of the enemy aircraft) that has been semi-locked on. When no enemy aircraft has been semi-locked on, the target locator indicates the direction of the enemy aircraft that is positioned nearest to the player's aircraft, or the direction of the enemy aircraft tracked by the player's aircraft. In this embodiment, the length of the target locator corresponds to the distance between the player's aircraft and the enemy aircraft. Specifically, the length of the target locator decreases when the distance between the player's aircraft and the enemy aircraft is 100 meters as compared with the case where the distance between the player's aircraft and the enemy aircraft is 200 meters.

Figure 5:
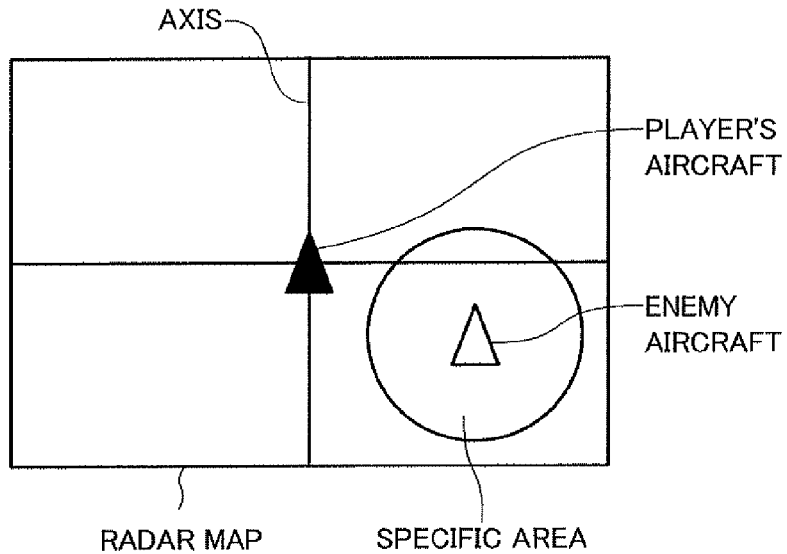
FIG. 5 illustrates a radar map.

FIG. 5 illustrates an example of the radar map. The radar map is a simplified image that indicates the position of the player's aircraft, the direction of the player's aircraft (direction of the nose of the player's aircraft), the position of the enemy aircraft, the direction of the enemy aircraft (direction of the nose of the enemy aircraft), and the positional relationship between the player's aircraft and the specific area set around the enemy aircraft in the object space (X and Z axes). As illustrated in FIG. 5, the enemy aircraft, the specific area, and the like are displayed on the radar map that is designed so that the position of the player's aircraft corresponds to the center of the radar map and the direction of the player's aircraft corresponds to the upward direction of the radar map, for example.

Figure 6:
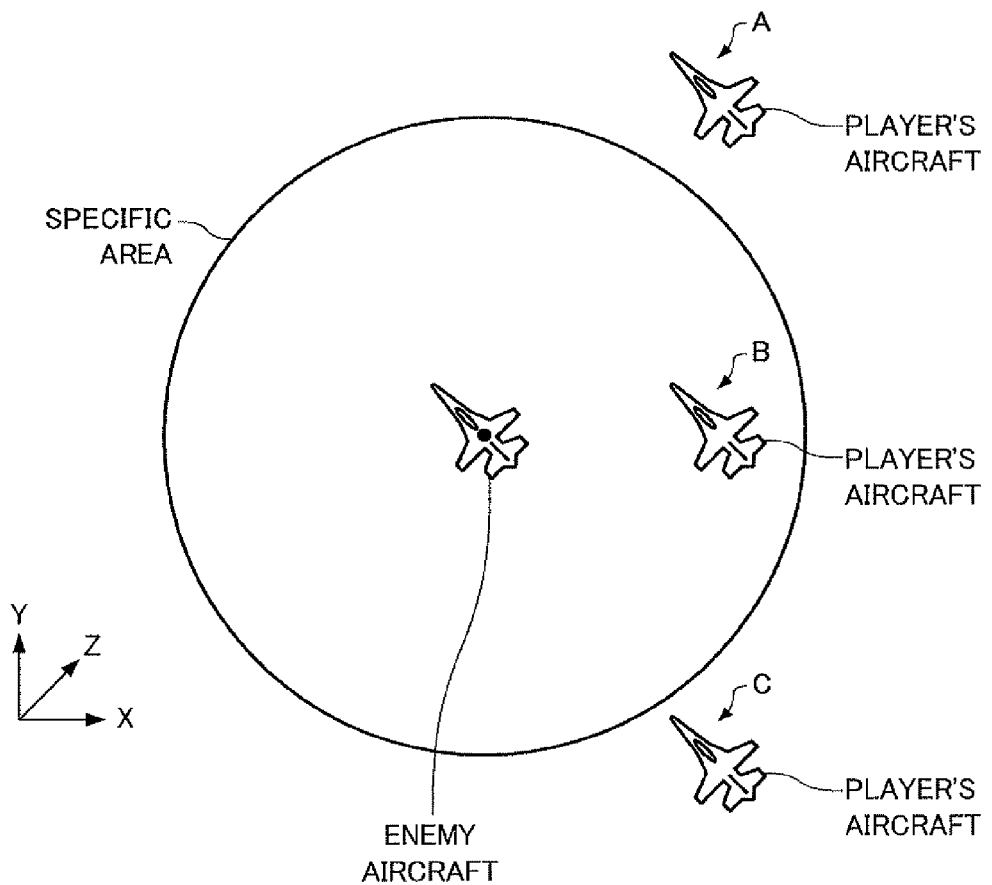
FIG. 6 illustrates a position of a player's aircraft with respect to a specific area.

In this embodiment, since the specific area is set using a sphere, the player's aircraft may not be positioned within the specific area when the altitude of the player's aircraft has changed (i.e., the Y-coordinate value has changed) even if the X-coordinate value and the Z coordinate value in the object space have not changed, as illustrated in FIG. 6. In this case, it is necessary to indicate whether or not the player's aircraft is positioned within the specific area using the radar map.

In this embodiment, the player can determine whether or not the player's aircraft is positioned within the specific area set around the enemy aircraft based on the display color of the specific area. Specifically, as illustrated in FIG. 7A, the specific area is displayed in a first color (e.g., deep orange) when the player's aircraft is positioned within the specific area set around the enemy aircraft, and is displayed in a second color (e.g., light orange) when the player's aircraft is not positioned within the specific area set around the enemy aircraft, as illustrated in FIG. 7B.

Figure 7A:
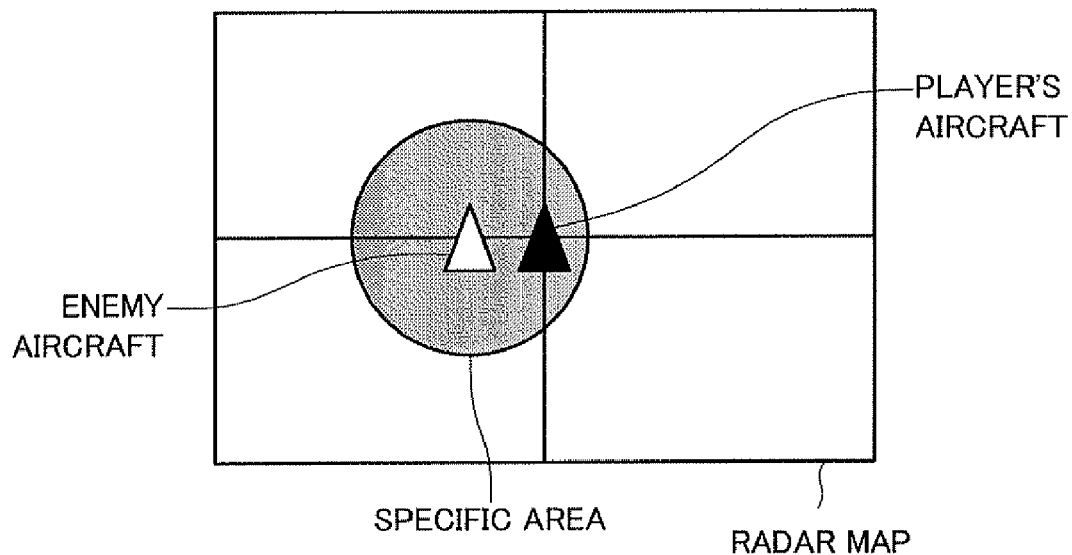
FIGS. 7A and 7B illustrate a radar map.
Figure 7B:
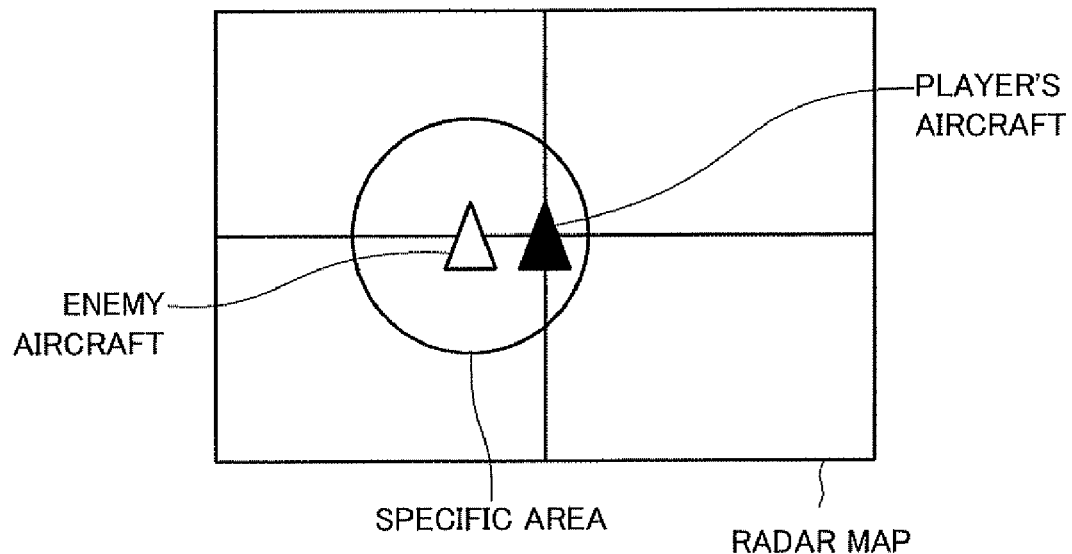

For example, when the player's aircraft is located at a position B in FIG. 6, the specific area is displayed in the first color, as illustrated in FIG. 7A. On the other hand, when the player's aircraft is located at a position A or C in FIG. 6, the specific area is displayed in the second color, as illustrated in FIG. 7B.

In this embodiment, even if the enemy aircraft is not displayed in the field-of-view image, the player can determine whether the player's aircraft is located at the position A above the enemy aircraft or located at the position C below the enemy aircraft based on the target locator that indicates the direction of the enemy aircraft.

2.3. Execution of Special Command

In this embodiment, the special command input information input by the player is received when the player's aircraft is positioned within the specific area set around the enemy aircraft. When the special command input information has been received, a moving path along which the player's aircraft is moved to a position behind the enemy aircraft (i.e., a position at which bullets fired from the player's aircraft can hit the enemy aircraft) is calculated irrespective of the movement input information input by the player, and the player's aircraft is moved along the calculated moving path. When the player's aircraft has been moved to a position behind the enemy aircraft, the relative positional relationship between the player's aircraft and the enemy aircraft is maintained for a predetermined period.

In this embodiment, when the special command has been received, a flight maneuver that enables the player's aircraft to be positioned behind the enemy aircraft is determined from a plurality of flight maneuvers (e.g., loop, Immelmann turn, chandelle, barrel roll, and slice turn) based on the current movement information (position, moving direction, and moving speed) relating to the player's aircraft and the enemy aircraft. Specifically, each of the flight maneuvers is associated in advance with the positional/directional relationship between the player's aircraft and the enemy aircraft. For example, a loop is associated with the case where the player's aircraft and the enemy aircraft are positioned at an almost identical altitude (e.g., the player's aircraft and the enemy aircraft are positioned at an altitude of 100 to 200 meters) and the direction of the player's aircraft and the direction of the enemy aircraft are identical. A turn flight maneuver (e.g., Immelmann turn) is associated with the case where the enemy aircraft is positioned higher than the player's aircraft (e.g., the enemy aircraft is positioned higher than the player's aircraft by 100 to 200 meters) and the direction of the player's aircraft is opposite to the direction of the enemy aircraft. A flight maneuver corresponding to the positional/directional relationship between the player's aircraft and the enemy aircraft when the special command input information has been received is determined. The moving path of the player's aircraft is calculated based on the determined flight maneuver, and the player's aircraft is moved along the calculated moving path.

When an obstacle is present in the calculated moving path, the player's aircraft crashes into the obstacle. In this case, an alert display (WARNING display) that indicates that the special command cannot be executed is performed. The term "obstacle" refers to an object such as the ground, the sea, a building, and another aircraft including an enemy aircraft. When an obstacle is present in the moving path of the player's aircraft based on the determined flight maneuver, another flight maneuver may be determined to be the flight maneuver of the player's aircraft.

Figure 8:
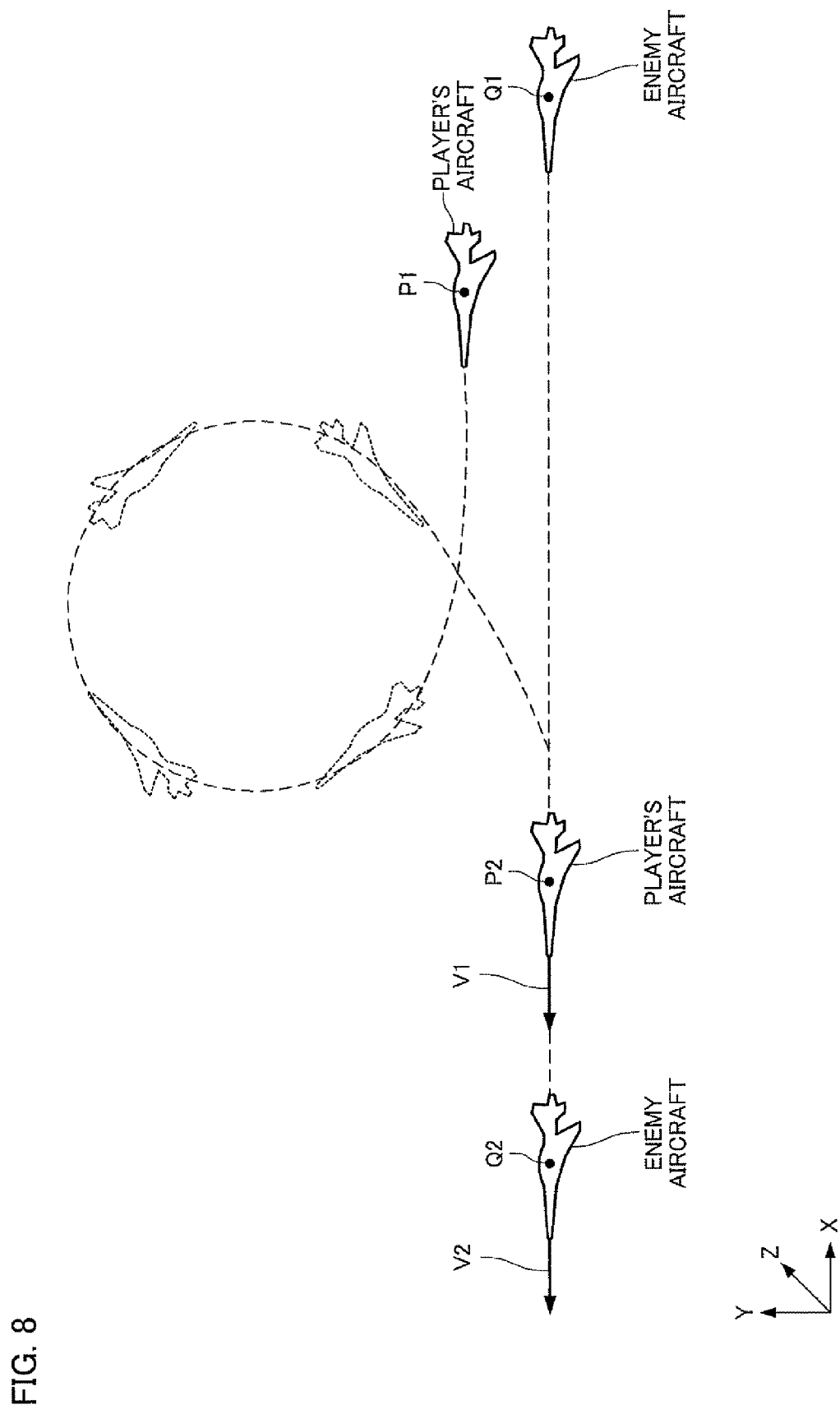
FIG. 8 illustrates a moving path of a player's aircraft based on execution of a special command.

FIG. 8 illustrates an example in which the player's aircraft is moved upon execution of the special command. For example, the player's aircraft is located at a position P1, the enemy aircraft is located at a position Q1, and the moving direction of the player's aircraft and the moving direction of the enemy aircraft are almost identical when the special command has been received. In this embodiment, when a loop among the plurality of flight maneuvers has been determined to be the flight maneuver that causes the player's aircraft to be positioned behind the enemy aircraft, the moving path of the player's aircraft based on the loop is calculated, and the player's aircraft is moved along the calculated moving path.

In this embodiment, the moving path of the player's aircraft may be corrected in order to move the player's aircraft to a position apart from the enemy aircraft by a predetermined distance in the direction opposite to the moving vector of the enemy aircraft.

For example, the moving path based on the loop has the same altitude as that of the position P1 when the special command has been received. However, the moving path based on the loop may not cause the player's aircraft to be moved to a position apart from the enemy aircraft by a predetermined distance in the direction opposite to the moving vector of the enemy aircraft. In this case, as illustrated in FIG. 8, the moving path of the player's aircraft is corrected so that the altitude of the player's aircraft is identical with the altitude of the enemy aircraft, for example.

Figure 9A:
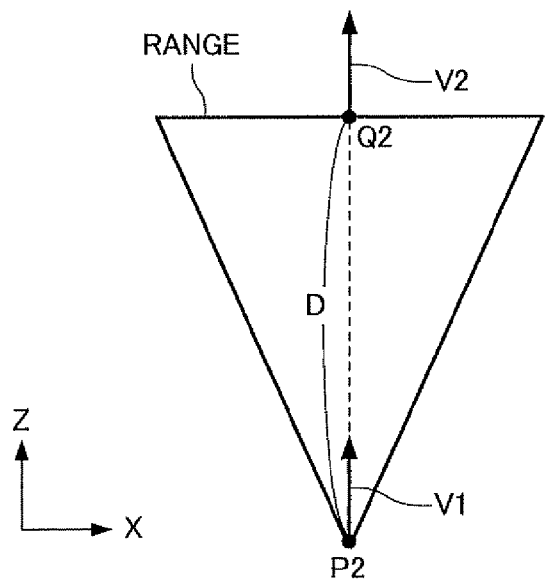
FIGS. 9A and 9B illustrate a positional relationship between a player's aircraft and an enemy aircraft based on execution of a special command.

FIGS. 9A (XZ plane) and 9B (XY plane) illustrate the relative positional relationship between the player's aircraft and the enemy aircraft when the player's aircraft has been automatically moved to a position behind the enemy aircraft upon execution of the special command.

Figure 9B:
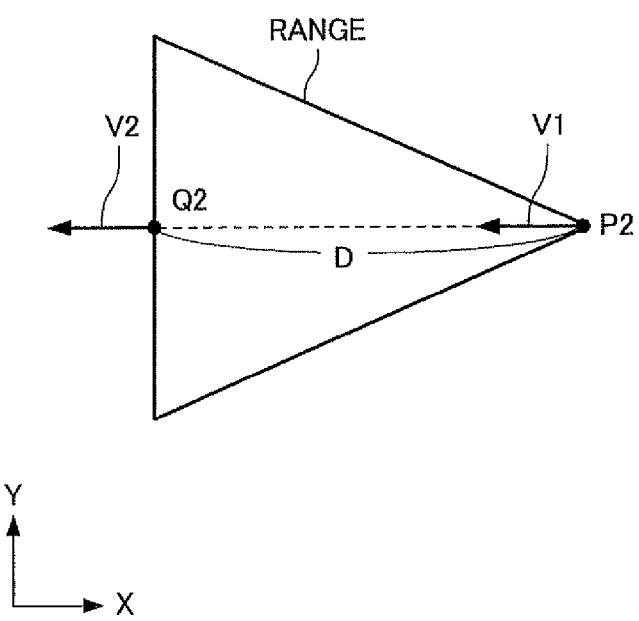

In this embodiment, as illustrated in FIGS. 9A and 9B, the player's aircraft is moved from a position Q2 of the enemy aircraft to a position apart from the position Q2 by a predetermined distance D in the direction opposite to a moving vector V2 of the enemy aircraft so that a moving vector V1 of the player's aircraft coincides with the moving vector V2 of the enemy aircraft.

In this embodiment, the relative positional relationship between the player's aircraft and the enemy aircraft illustrated in FIGS. 9A and 9B is maintained for a predetermined period (e.g., 20 frames when the frame rate is 60 fps). Specifically, the direction of the moving vector V1 of the player's aircraft is caused to coincide with the direction of the moving vector V2 of the enemy aircraft in the predetermined period while setting the difference in speed between the player's aircraft and the enemy aircraft at 0 km per hour Therefore, the moving speed of at least one of the player's aircraft and the enemy aircraft is adjusted when the special command input information has been received so that the moving speed of the player's aircraft coincides with the moving speed of the enemy aircraft in order to implement a natural movement.

According to this embodiment, since the direction of the moving vector of the player's aircraft is caused to coincide with the direction of the moving vector of the enemy aircraft in the predetermined period while setting the difference in speed between the player's aircraft relative to the enemy aircraft at 0 km per hour, even an inexperienced player can cause bullets fired by performing a shooting input operation to hit to the enemy aircraft if the player has performed the input operation at an appropriate timing. The player can shoot down the enemy aircraft by causing a number of bullets fired from the player's aircraft to hit the enemy aircraft depending on the durability of the enemy aircraft. The predetermined period may be changed corresponding to the type of the enemy aircraft.

When the predetermined period has elapsed, a process that causes the enemy aircraft to evade tracking by the player's aircraft may be performed based on a predetermined computer algorithm (or based on input information input by an opposing player). Therefore, the player must perform a shooting input operation at an appropriate timing to fire bullets at the enemy aircraft.

Specifically, the special command according to this embodiment causes the relative positional relationship between the player's aircraft and the enemy aircraft to be determined so that bullets fired from the player's aircraft can hit the enemy aircraft, causes the player's aircraft to be automatically moved along a maneuver flight path so that the determined positional relationship is achieved, and causes the relative positional relationship between the player's aircraft and the enemy aircraft to be maintained for the predetermined period.

According to this embodiment, since the player can cause the special command to be executed by causing the player's aircraft to be positioned within the specific area set around the enemy aircraft and performing the special command input operation instead of performing the movement operation that causes the player's aircraft to follow the enemy aircraft, the player can easily move the player's aircraft to a position behind the enemy aircraft. Therefore, since the player can easily aim at the enemy aircraft, even an inexperienced player can enjoy playing the shooting game by shooting down the enemy aircraft.

2.4. Special Gauge

In this embodiment, the accuracy rate of bullets fired from the machine gun installed in the player's aircraft is determined based on a special gauge, and the player's aircraft is moved to a position corresponding to the accuracy rate.

The term "accuracy rate" used herein refers to a percentage that indicates the number of bullets that are fired from the machine gun installed in the player's aircraft and hit the enemy aircraft. The bullets hit the enemy aircraft at a probability of 1% or more when the enemy aircraft is positioned within the range of the player's aircraft. For example, 100 bullets are fired when the shooting input information has been received, and at least one bullet hits the enemy aircraft when the enemy aircraft is positioned within the range of the player's aircraft.

In this embodiment, bullets fired from the player's aircraft (the machine gun installed in the player's aircraft) travel radially from the player's aircraft. Therefore, the accuracy rate increases as the distance between the player's aircraft and the enemy aircraft decreases.

Figure 10:
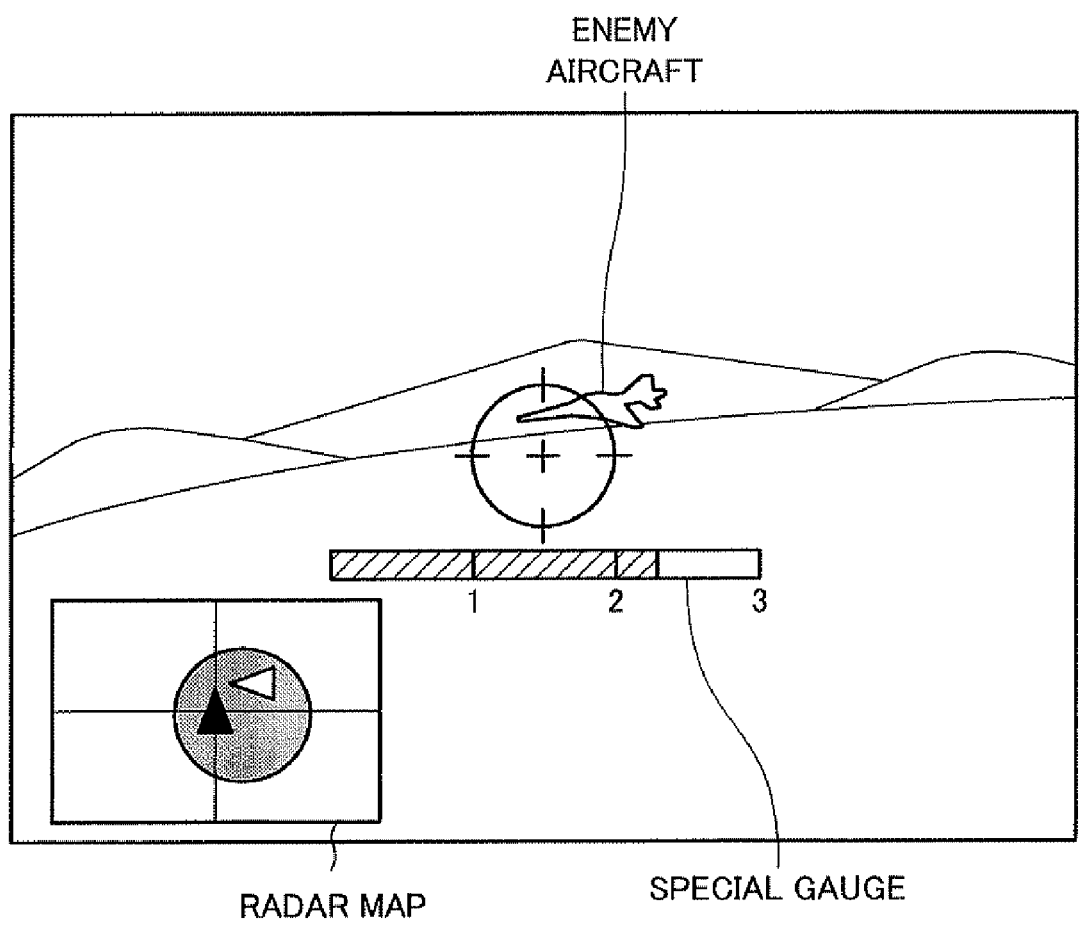
FIG. 10 illustrates an example of a display screen that displays a special gauge.

FIG. 10 illustrates an example of a display screen that displays the special gauge. In this embodiment, the special gauge is displayed when the player's aircraft is positioned within the specific area set around the enemy aircraft. Specifically, the special gauge indicates that the player can input the special command.

In this embodiment, an initial value is set as the value of the special gauge when the player's aircraft is positioned within the specific area set around the enemy aircraft, and the value of the special gauge is increased based on the elapsed time until the special command is received.

As illustrated in FIG. 10, three levels are set corresponding to the value of the special gauge. For example, the level is set at a level 1 when the value of the special gauge is equal to or greater than a first predetermined value and less than a second predetermined value, set at a level 2 when the value of the special gauge is equal to or greater than the second predetermined value and less than a third predetermined value, and set at a level 3 when the value of the special gauge is equal to or greater than the third predetermined value. The accuracy rate is determined based on the level when the special command has been received. In this embodiment, the initial value of the special gauge is set at the first predetermined value, and the special command is received when the level is at least the level 1.

The accuracy rate according to this embodiment based on the level of the special gauge is described below.

Figure 11A:
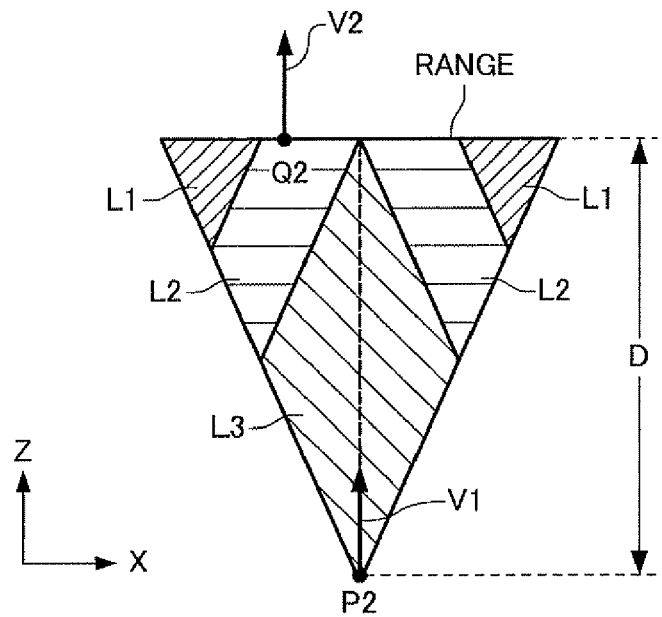
FIGS. 11A and 11B illustrate a positional relationship between a player's aircraft and an enemy aircraft based on execution of a special command according to an accuracy rate.
Figure 11B:
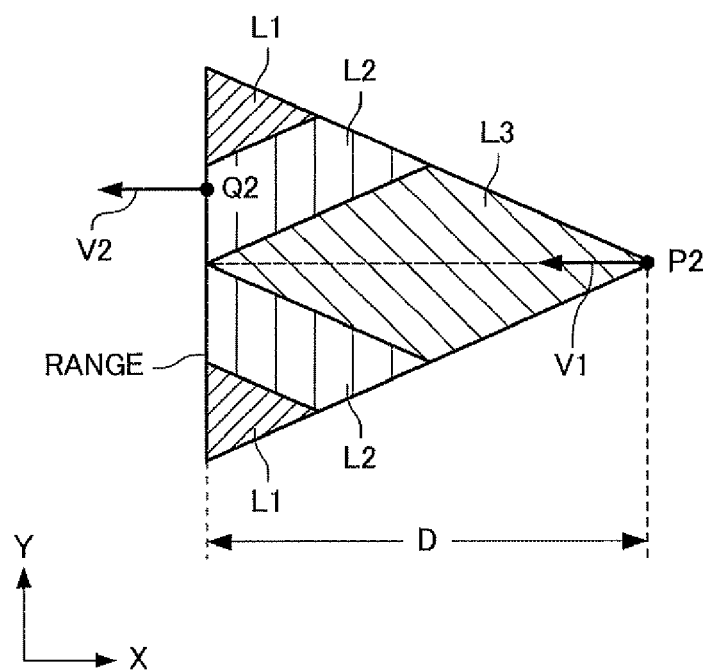

FIGS. 11A (XZ plane) and 11B (XY plane) illustrate the relative positional relationship between the player's aircraft and the enemy aircraft that allows bullets fired from the player's aircraft to bit the enemy aircraft upon execution of the special command.

For example, an area L1 within the range of the player's aircraft corresponds to an accuracy rate of 1 to 20%, an area L2 within the range of the player's aircraft corresponds to an accuracy rate of 21 to 80%, and an area L3 within the range of the player's aircraft corresponds to an accuracy rate of 81 to 100%.

In this embodiment, one of the areas L1 to L3 corresponding to the level when the special command input information has been received is determined, the position of the player's aircraft is determined so that the enemy aircraft is positioned in the determined area, and the moving path of the player's aircraft is then calculated. Specifically, the relative positional relationship between the player's aircraft and the enemy aircraft is determined so that the enemy aircraft is positioned in the area L1 at the level 1, positioned in the area L2 at the level 2, and positioned in the area L3 at the level 3, and the determined positional relationship is maintained for the predetermined period.

In this embodiment, the player's aircraft and the enemy aircraft are controlled respective of the area so that the direction of the moving vector V1 of the player's aircraft coincides with the direction of the moving vector V2 of the enemy aircraft.

The predetermined period in which the positional relationship between the player's aircraft and the enemy aircraft is maintained may be changed corresponding to the level when the special command input information has been received. For example, the predetermined period is set at 10 frames when the special command input information has been received at the level 1, set at 20 frames when the special command input information has been received at the level 2, and set at 30 frames when the special command input information has been received at the level 3.

Therefore, the player can enjoy maintaining the player's aircraft within the specific area of the enemy aircraft for a long period of time and inputting the special command when the value of the special gauge has reached the level 3.

2.5. Control of Virtual Camera

In this embodiment, the virtual camera (viewpoint) is controlled in the object space as described below.

In this embodiment, the player's aircraft is automatically moved to a position behind the enemy aircraft utilizing the flight maneuver. Since the flight maneuver attracts the player, it is desirable to generate an impressive image that satisfies the player.

In this embodiment, a field-of-view image viewed from a first-person viewpoint (i.e., the viewpoint of the pilot that operates the player's aircraft) or a third-person viewpoint (i.e., a viewpoint that observes the player's aircraft (gaze point) from behind) is displayed on the display screen until the special command input information is received.

When the special command input information has been received, the virtual camera observes the player's aircraft from an observer viewpoint, and the position, the direction, the angle of view, the moving direction, and the moving speed of the virtual camera are controlled based on the moving path (flight maneuver). For example, the virtual camera is disposed at a position apart from the player's aircraft and the enemy aircraft so that the player can observe the moving path of the player's aircraft, and an image that objectively shows a state in which the player's aircraft moves along the maneuver flight path is generated.

In this embodiment, the viewpoint is returned to the first-person viewpoint or the third-person viewpoint from the observer viewpoint before the determined positional relationship between the player's aircraft and the enemy aircraft is maintained for the predetermined period after moving the player's aircraft along the moving path based on the maneuver flight path. Specifically, the viewpoint is controlled so that the player can easily perform a shooting input operation aimed at the enemy aircraft after the player's aircraft has been positioned behind the enemy aircraft.

The virtual camera is controlled in this manner in order to satisfy the player by displaying an image that includes the flight maneuver of the player's aircraft and the background (e.g., sea, mountain, and sky) and prevent the player from losing the vertical/horizontal/back-and-forth positional relationship due to acrobatics based on the flight maneuver.

An example of controlling the viewpoint of the virtual camera based on the moving path calculated based on the flight maneuver of the player's aircraft when the special command input information has been received is described below.

Figure 12:
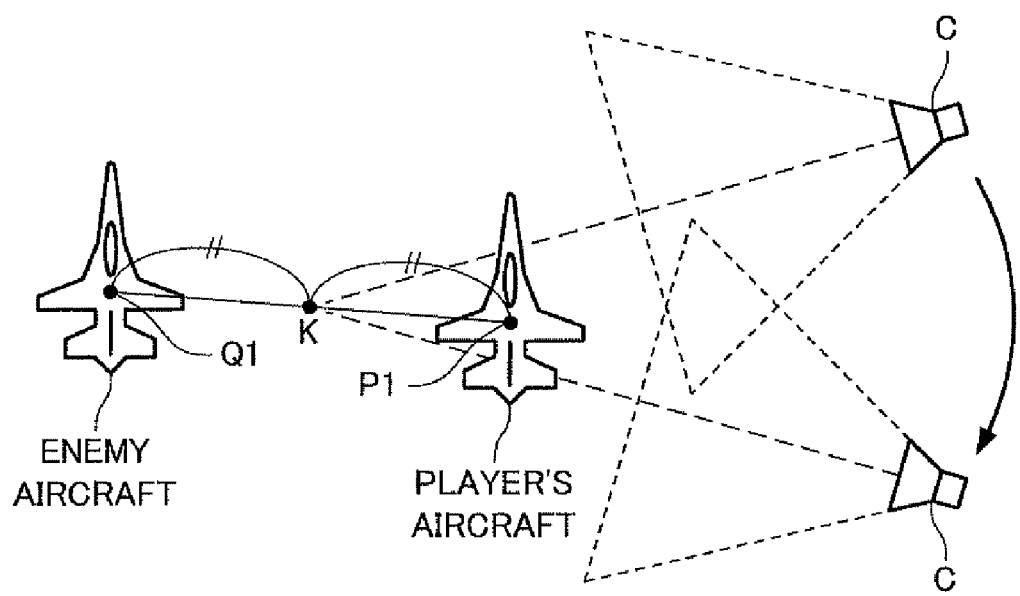
FIG. 12 illustrates control of a virtual camera.

In this embodiment, a turn-around viewpoint control process is performed. As illustrated in FIG. 12, the turn-around viewpoint control process refers to a process that calculates an intermediate position K between the position P1 of the player's aircraft and the position Q1 of the enemy aircraft and rotates the virtual camera C around the intermediate position K (i.e., gaze point). Therefore, an image that allows the player to easily determine the positional relationship between the player's aircraft and the enemy aircraft can be generated.

Figure 13A:
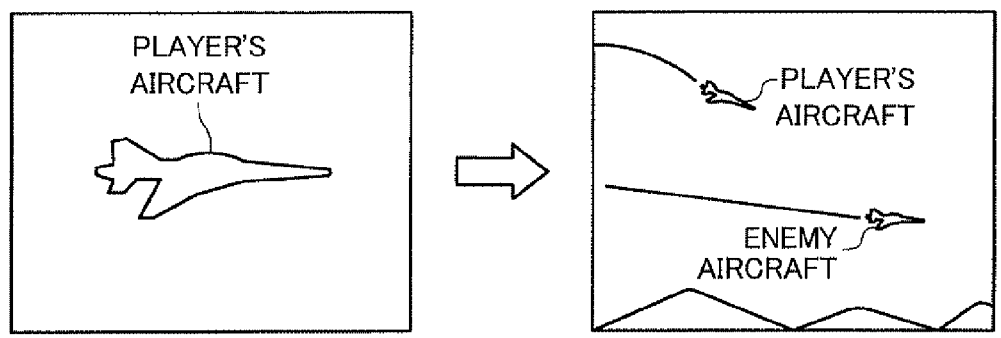
FIGS. 13A and 13B illustrate control of a virtual camera.
Figure 13B:
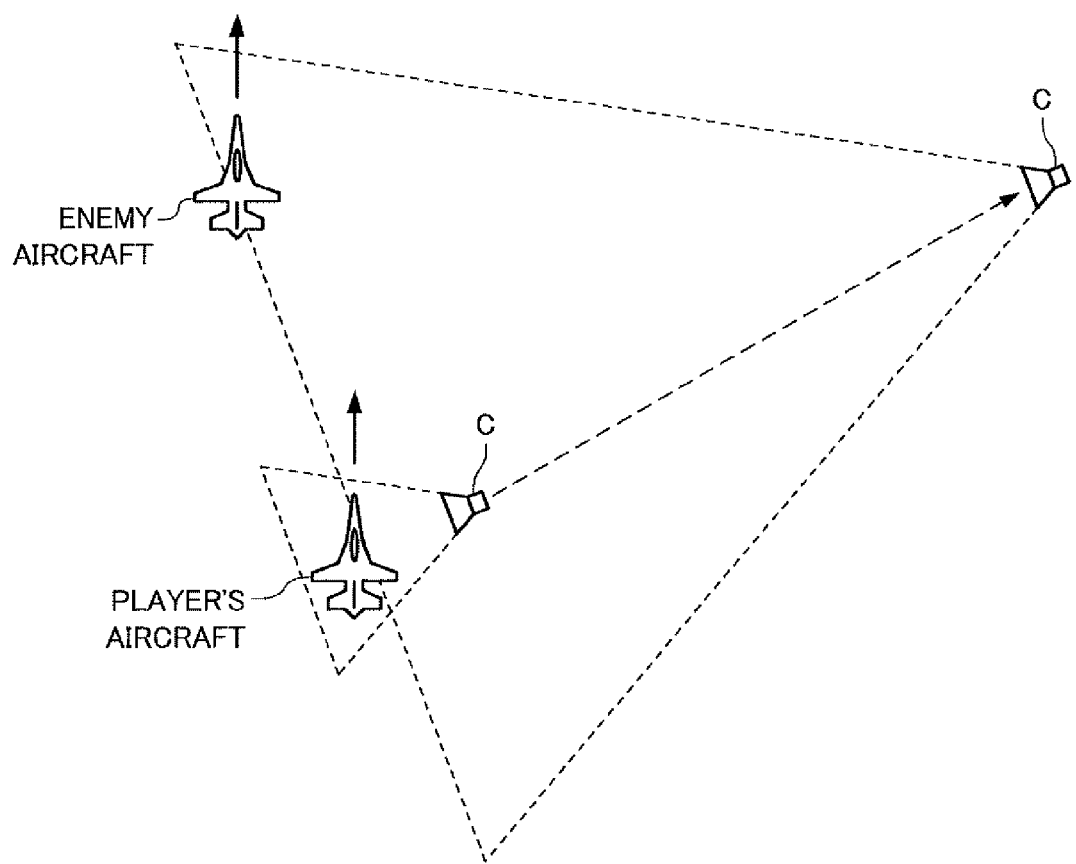

In this embodiment, the virtual camera C may be gradually moved away from a position near the player's aircraft, as illustrated in FIGS. 13A and 13B.

Specifically, only the player's aircraft is positioned within the field of view (view volume) of the virtual camera C when the special command input information has been received, and the virtual camera C may be gradually moved away from the player's aircraft so that the player's aircraft and the enemy aircraft are positioned within the field of view of the virtual camera C.

Figure 14A:
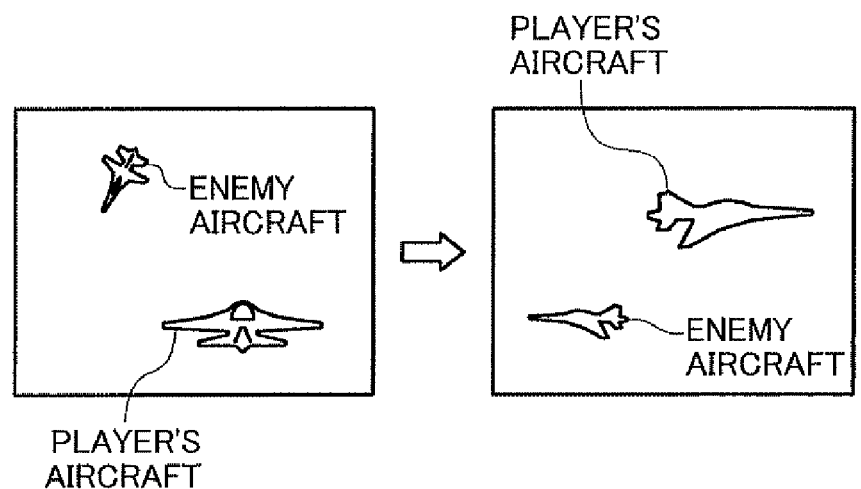
FIGS. 14A and 14B illustrate control of a virtual camera.
Figure 14B:
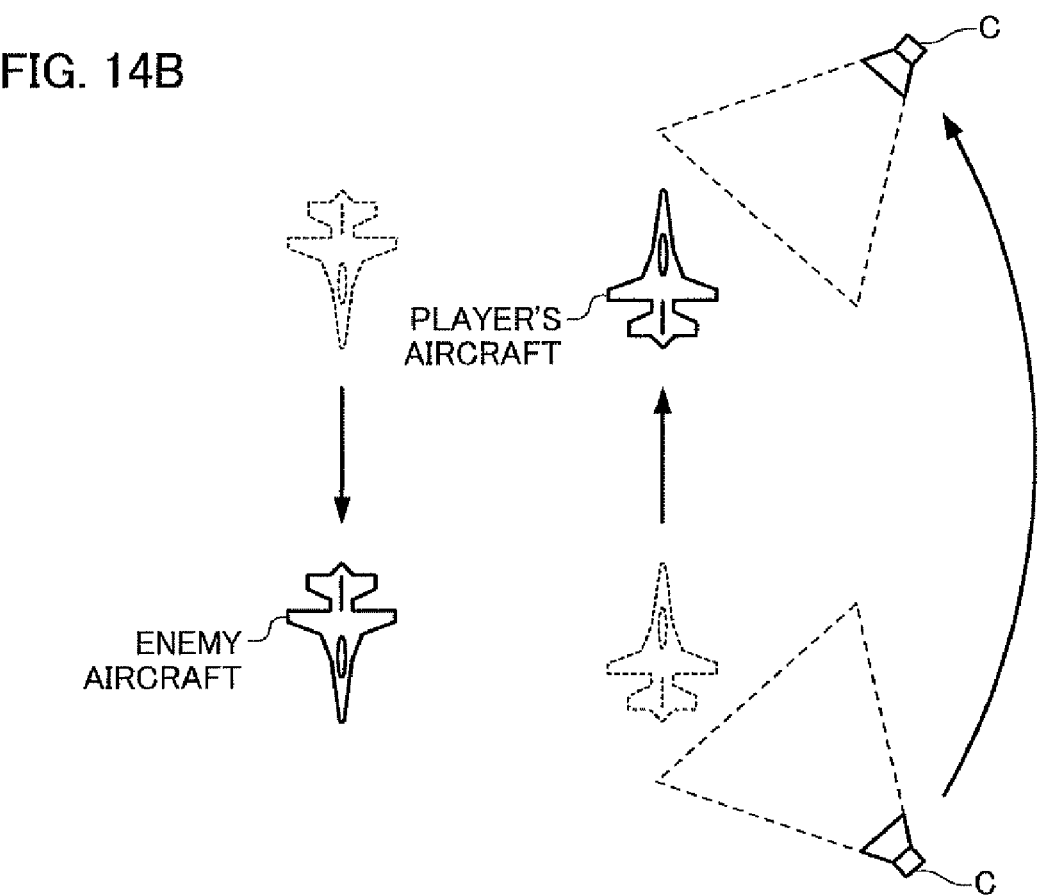

FIGS. 14A and 14B illustrate movement control of the virtual camera C when the player's aircraft and the enemy aircraft move in opposite directions. In this case, the virtual camera C is moved so that the player's aircraft is positioned in front of the virtual camera C and the enemy aircraft is positioned away from the virtual camera C as compared with the player's aircraft, as illustrated in FIGS. 14A and 14B. The virtual camera C is moved to follow to the movement of the player's aircraft. Therefore, an image that allows the player to observe the movement of the enemy aircraft across the player's aircraft together with the movement of the player's aircraft can be generated.

FIGS. 15A to 15C illustrate movement control of the virtual camera C when the player's aircraft is moved by a turn flight maneuver (e.g., Immelmann turn). In this case, the direction and the angle of view of the virtual camera are changed while fixing the position of the virtual camera C. For example, the player's aircraft is positioned in the field of view of the virtual camera C by reducing the angle of view of the virtual camera C, as illustrated in FIG. 15A, and the direction of the virtual camera C is changed and the angle of view of the virtual camera C is increased according to the movement of the player's aircraft, as illustrated in FIG. 15B. When the player's aircraft is positioned behind the enemy aircraft, the player's aircraft and the enemy aircraft are positioned within the field of view of the virtual camera C.

FIGS. 16A to 16C illustrate movement control of the virtual camera C when the player's aircraft performs a turn flight maneuver (e.g., Immelmann turn). For example, the virtual camera C is moved to follow the enemy aircraft behind the enemy aircraft, and is moved so that the player's aircraft is positioned closer to the virtual camera C than the enemy aircraft when the player's aircraft has made an Immelmann turn and is positioned within the view volume.

FIGS. 17A to 17C illustrate movement control of the virtual camera C when the player's aircraft performs a turn flight maneuver (e.g., Immelmann turn). For example, the virtual camera C is moved to follow the enemy aircraft in front of the enemy aircraft, and is moved so that the enemy aircraft is positioned closer to the virtual camera C than the player's aircraft when the player's aircraft has made an Immelmann turn and the player's aircraft is positioned within the view volume.

Note that a plurality of virtual cameras may be disposed in the object space, a virtual camera optimum for the moving path of the player's aircraft may be determined, and an image viewed from the determined virtual camera may be generated.

2.6. Input Information Reception Process

Figure 18:
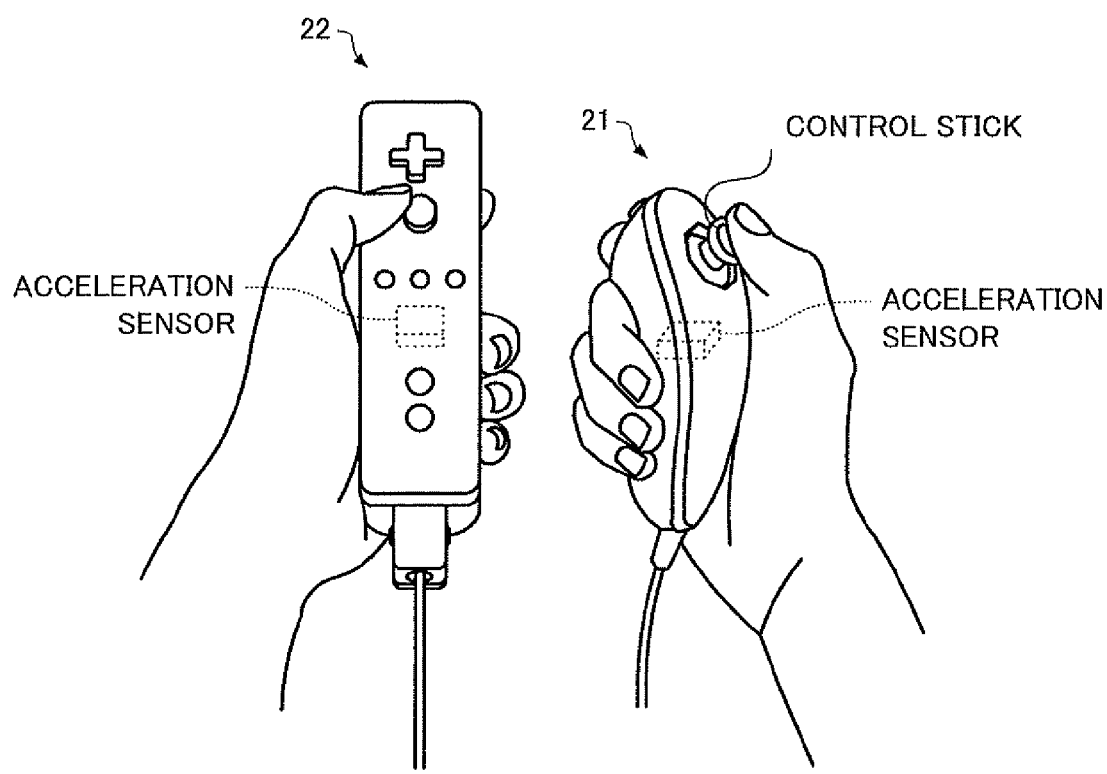
FIG. 18 illustrates an input device according to one embodiment of the invention.

FIG. 18 illustrates input devices 21 and 22 (i.e., input device 20) according to this embodiment. As illustrated in FIG. 18, the player may hold the input device 21 with the right hand, and hold the input device 22 with the left hand, for example.

The input device 21 includes a control stick as an operating section, and detects (outputs) a direction input. The input device 22 includes an arrow key and a plurality of buttons as operating sections. In this embodiment, the special command input information corresponds to input information input using a predetermined button (button A).

In this embodiment, the triaxial accelerations are detected by an acceleration sensor provided in each of the input devices 21 and 22. Since the gravitational acceleration always acts on an object in the real world, the inclination directions of the input devices 21 and 22 can be calculated based on the gravitational acceleration. In this embodiment, the accelerations detected by each acceleration sensor are used as the movement input information.

Figure 19A:
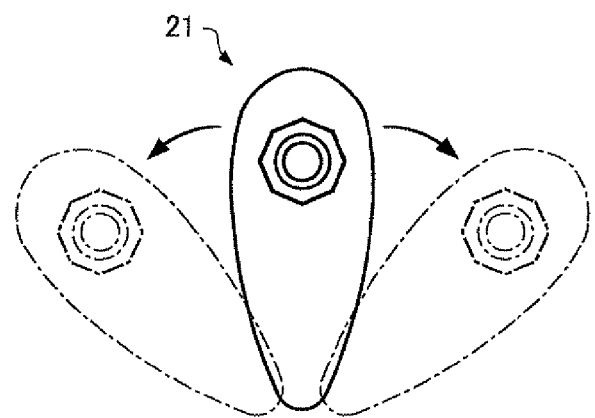
FIGS. 19A to 19C illustrate input information according to one embodiment of the invention.
Figure 19B:
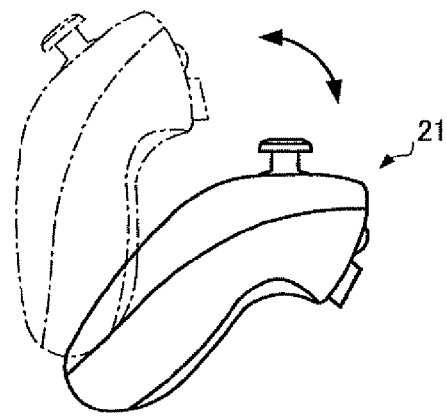

Specifically, the moving direction (turning direction) of the player's aircraft is determined based on the accelerations detected by the acceleration sensor provided in the input device 21, and the moving speed of the player's aircraft is controlled based on the accelerations detected by the acceleration sensor provided in the input device 22, as illustrated in FIGS. 19A and 19B.

For example, the player's aircraft turns right in the object space when the player has inclined the input device 21 to the right, and turns left in the object space when the player has inclined the input device 21 to the left, as illustrated in FIG. 19A.

The player's aircraft turns upward in the object space when the player has inclined the input device 21 upward, and turns downward in the object space when the player has inclined the input device 21 downward, as illustrated in FIG. 19B.

An inexperienced player tends to become unable to determine the upward direction and the downward direction in the object space. In this embodiment, when input information that causes the player's aircraft to turn at an angle of more than 135 degrees with respect to the horizontal plane in the object space has been received, the player's aircraft is automatically maintained horizontally.

Figure 19C:
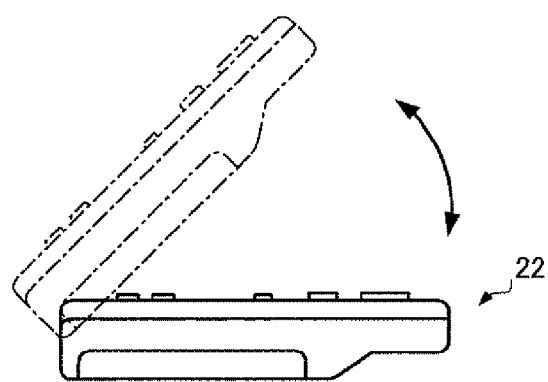

When the player has inclined the input device 22 upward from a horizontal state, as illustrated in FIG. 19C, the player's aircraft is accelerated in the object space. When the player has returned the input device 22 to a horizontal state, the player's aircraft is decelerated to a predetermined speed (300 km per hour), and the moving speed of the player's aircraft is controlled so that the predetermined speed is maintained.

According to the above-described operation, the player can perform an operation as if to operate a control stick of an actual aircraft. In this embodiment, bullets may be fired based on input information input using a shooting button (e.g., button B) that causes bullets to be fired from the cannon.

2.7. Replay

In this embodiment, game play performed by the player is reproduced based on the history of the input information input by the player and the history of the movement information relating to the player's aircraft and the enemy aircraft.

For example, the history of the input information input by the player and the history of the movement information relating to the player's aircraft and the enemy aircraft are stored in the storage section, and a replay image is generated based on the history of the input information and the history of the movement information relating to the player's aircraft and the enemy aircraft in a predetermined period. In this embodiment, a replay virtual camera differing from the virtual camera used during the game process is controlled when generating the replay image to generate an image viewed from the replay virtual camera. In this case, the replay virtual camera may be controlled in the same manner as in the case of executing the special command.

In this embodiment, when a game stage has been cleared, a replay image in the game stage that has been cleared is generated and displayed. When it has been determined that the enemy aircraft has been shot down as a result of execution of the special command, a replay image in a period from the time when the enemy aircraft has been semi-locked on to the time when the enemy aircraft has been shot down may be generated and displayed. A replay image that shows a state in which the player's aircraft moves along the maneuver flight path upon execution of the special command or the like may be generated and displayed irrespective of whether or not the enemy aircraft has been shot down.

3. Process According to This Embodiment

Figure 20:
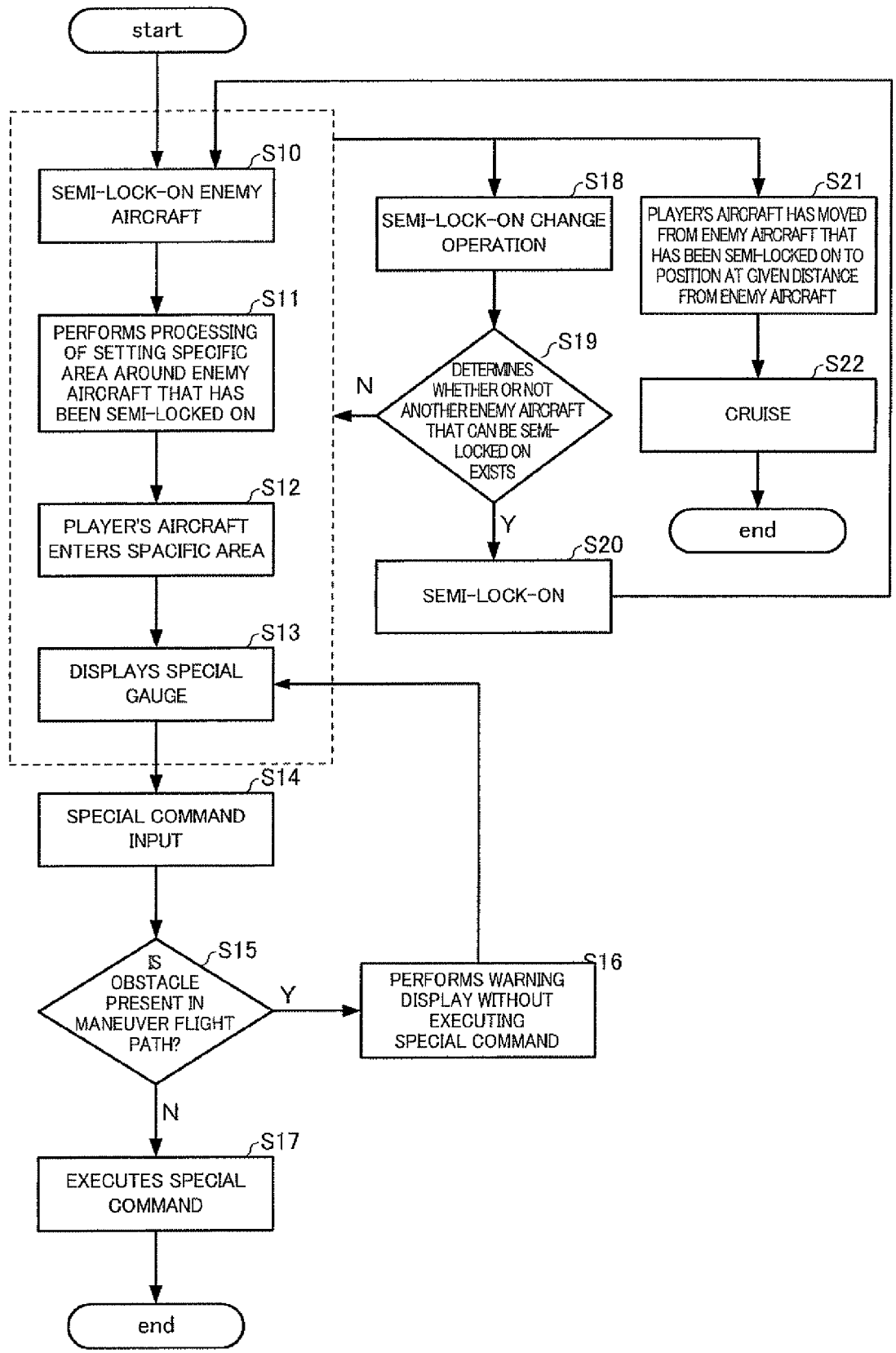
FIG. 20 is a flowchart of a process according to one embodiment of the invention.

The process according to this embodiment is described below with reference to FIG. 20.

The enemy aircraft is semi-locked on (i.e., processing of setting the specific area around the enemy aircraft that is positioned within a given distance from the player's aircraft is performed) (step S10). The specific area is generated around the enemy aircraft that has been semi-locked on (step S11). When the player's aircraft has entered the specific area (step S12), the special gauge is displayed (step S13). When the special command has been input (step S14), whether or not an obstacle is present in the maneuver flight path (moving path) is determined (step S15). When it has been determined that an obstacle is present in the maneuver flight path (Yes in step S15), a WARNING display (alert display) is performed without executing the special command (step S16), and the process returns to the step SI 3. When it has been determined that an obstacle is not present in the maneuver flight path (No in step S15), the special command is executed, and the process ends.

When a semi-lock-on change operation has been performed during the process in the steps S10 to S13 (step S18), whether or not another enemy aircraft that can be semi-locked on exists is determined (step S19). When it has been determined that another enemy aircraft that can be semi-locked on exists (Yes in step S19), the enemy aircraft is semi-locked on (step S20), and the process returns to the step S10. When it has been determined that another enemy aircraft that can be semi-locked on does not exist (No in step S19), the process in the steps S10 to S13 is again performed.

When the player's aircraft has moved from the enemy aircraft that has been semi-locked on to a position at a given distance from the enemy aircraft (step S21), the player's aircraft is caused to cruise (step S22), and the process ends.

4. Application Example 4.1. Application Example of Specific Area

Figure 21:
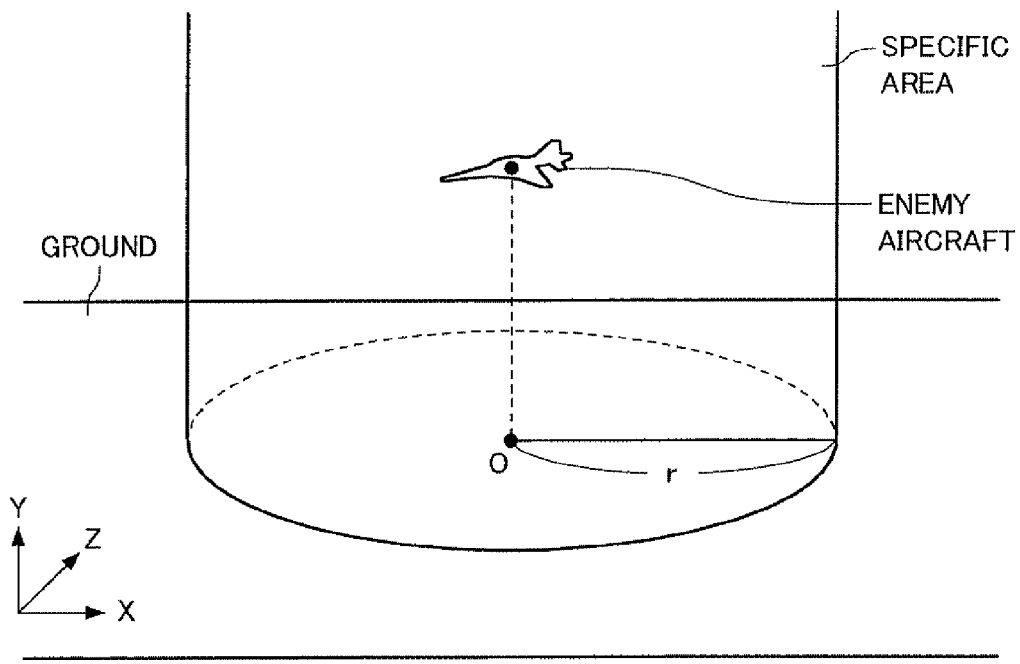
FIG. 21 illustrates a specific area.
Figure 22:
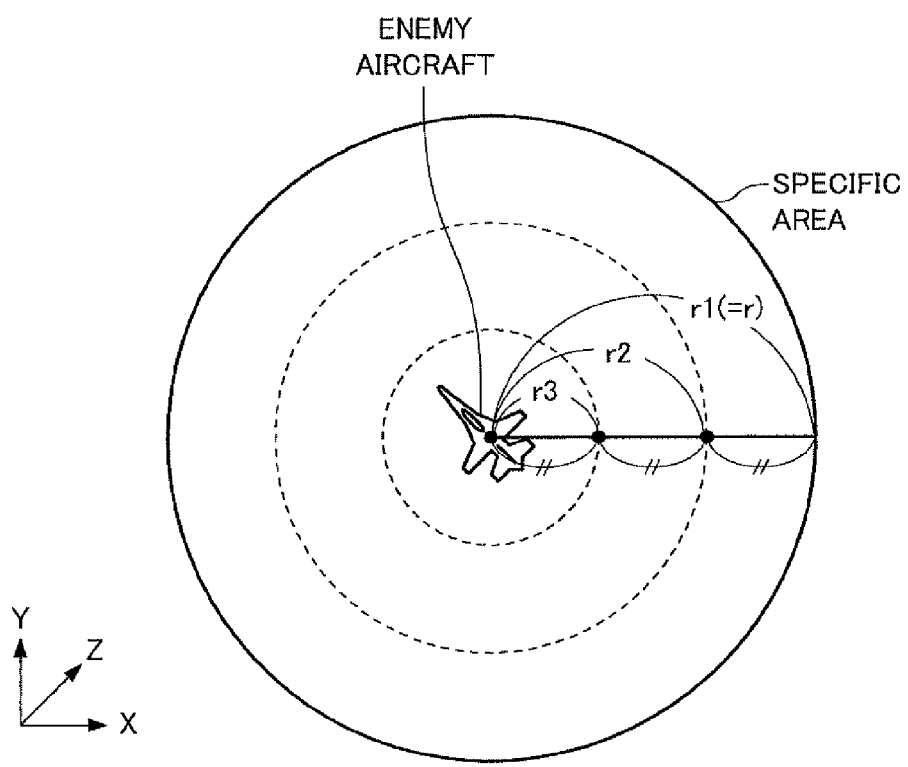
FIG. 22 illustrates a special gauge.

The specific area according to this embodiment that is set around the enemy aircraft is not limited to a sphere, but may be a cube, a column, a prism, a cone, or a pyramid. For example, a specific area in which the enemy aircraft is disposed corresponding to the center of a column having a radius r and an infinite height may be set, as illustrated in FIG. 21.

In this case, since it is unnecessary for the player to take account of the difference in the Y-axis direction (difference in altitude) when the player's aircraft is positioned within the specific area set around the enemy aircraft, the player can easily perform an operation that moves the player's aircraft to a position within the specific area. Moreover, since it suffices that the player determine whether or not the player's aircraft is positioned within a circle that indicates the specific area on the radar map, the player can easily determine whether or not the player's aircraft is positioned within the specific area.

4.2. Application Example of Special Gauge

In this embodiment, the value of the special gauge may be changed based on the positional relationship between the player's aircraft and the enemy aircraft.

For example, when the player's aircraft is positioned within the specific area set around the enemy aircraft, the value of the special gauge is changed based on the distance between the player's aircraft and the enemy aircraft. In this case, a position at a distance r1 (i.e., the radius r of the specific area) from the enemy aircraft is associated with the first predetermined value, a position at a distance r2 from the enemy aircraft is associated with the second predetermined value, and a position at a distance r3 from the enemy aircraft is associated with the third predetermined value, for example.

Specifically, the level is set at the level 1 when the distance between the player's aircraft and the enemy aircraft when the special command has been received is equal to or less than r1 and greater than r2, set at the level 2 when the distance between the player's aircraft and the enemy aircraft when the special command has been received is equal to or less than r2 and greater than r3, and set at the level 3 when the distance between the player's aircraft and the enemy aircraft when the special command has been received is equal to or less than r3. According to this configuration, the value of the special gauge can be increased by reducing the distance between the player's aircraft and the enemy aircraft.

4.3. Flight Maneuver

In this embodiment, a flight maneuver may be determined based on maneuver input information input by the player, and the player's aircraft may be moved based on the determined maneuver flight path.

For example, a plurality of flight maneuvers are respectively associated with a plurality of pieces of maneuver input information in advance, a flight maneuver is determined based on the maneuver input information input by the player, and the player's aircraft is moved based on the determined maneuver flight path.

In this case, the player's aircraft can be moved to a position behind the enemy aircraft along the maneuver flight path. Therefore, an experienced player can move the player's aircraft to a position behind the enemy aircraft by performing a maneuver input operation.

An inexperienced player can evade an attack by the enemy aircraft by performing a maneuver input operation.

In this embodiment, direction input information input using the control stick of the input device 21 in FIG. 18 is used as the maneuver input information. A flight maneuver is selected (determined) from a plurality of flight maneuvers based on the direction input information. For example, when downward-downward-rightward direction input information is associated with an Immelmann turn in advance, the player's aircraft is moved along the Immelmann turn path when downward-downward-rightward direction input information has been received.

When the maneuver input information has been received, the virtual camera may be controlled in the same manner as in the case of executing the special command.

In this embodiment, the special command may be executed when the maneuver input information has been received. In this case, the moving path is calculated based on the flight maneuver corresponding to the maneuver input information input by the player, and whether or not the calculated moving path allows the player's aircraft to be moved to a position behind the enemy aircraft is determined. When it has been determined that the calculated moving path allows the player's aircraft to be moved to a position behind the enemy aircraft, the player's aircraft is automatically moved to a position behind the enemy aircraft along the maneuver flight path, and the relative positional relationship between the player's aircraft and the enemy aircraft is maintained for the predetermined period. According to this configuration, the player can move the player's aircraft to a position behind the enemy aircraft utilizing a favorite flight maneuver.

4.4. Flight Maneuver Combination

In this embodiment, the moving path of the player's aircraft may be determined by combining a plurality of flight maneuvers. In the case where the player manually selects a flight maneuver, when slice turn input information and barrel roll input information have been received successively, for example, the player's aircraft may be moved along a moving path that combines a slice turn and a barrel roll.

Therefore, an experienced player can input appropriate maneuver input information while taking account of the positional relationship between the player's aircraft and the enemy aircraft.

4.5. Enemy Ground Object

In this embodiment, a specific area may be set around an enemy ground object (e.g., tank), and the special command may be received when the player's aircraft is positioned within the specific area around the enemy ground object. The moving path of the player's aircraft may be calculated when the special command has been received, and the player's aircraft may be moved based on the moving path to shoot the enemy ground object.

Figure 23:
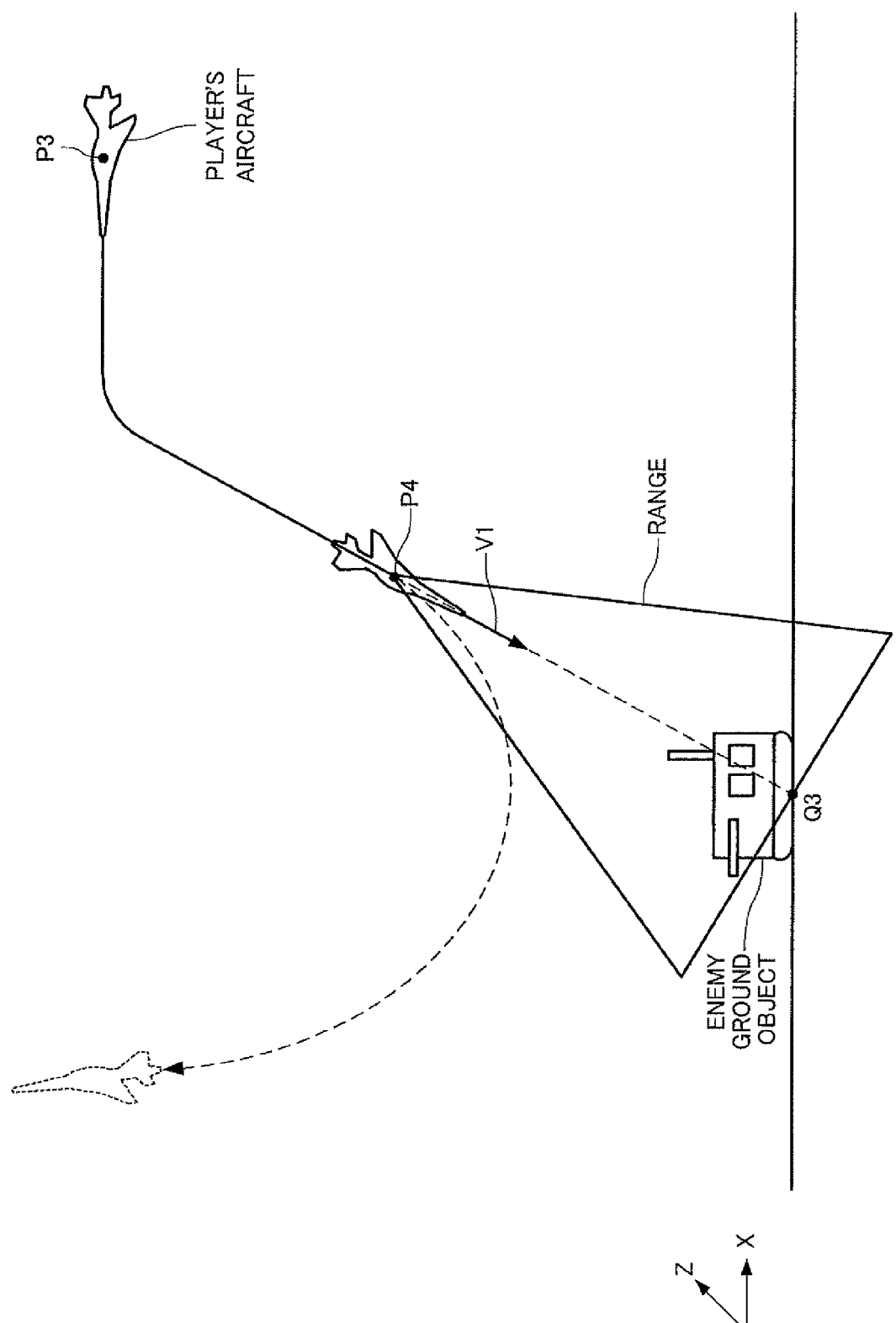
FIG. 23 illustrates a moving path of a player's aircraft based on execution of a special command and a positional relationship between the player's aircraft and an enemy ground object.

FIG. 23 illustrates an example in which the player's aircraft attacks the enemy ground object. In this embodiment, the special command input information is received when the enemy ground object is located at a position Q3 and the player's aircraft is positioned within the specific area (radius: r) set around the enemy ground object (i.e., the player's aircraft is located at a position P3), for example.

When the special command input information has been received, the player's aircraft is moved to a position at which bullets fired from the player's aircraft can hi the enemy ground object. For example, the player's aircraft is moved toward the position Q3 of the enemy ground object.

In this embodiment, the player's aircraft is moved to a position P4 at which the enemy ground object is positioned within the range of the player's aircraft irrespective of the movement input information input by the player. For example, the player's aircraft is moved based on a nose-dive flight maneuver. This allows an inexperienced player to easily aim at the enemy ground object.

In this embodiment, the special command relating to the enemy ground object causes the relative positional relationship between the player's aircraft and the enemy ground object to be determined so that bullets fired from the player's aircraft can hit the enemy ground object, and causes the player's aircraft to be automatically moved along a maneuver flight path so that the determined positional relationship is achieved. Therefore, the player's aircraft crashes into the ground if the player does not perform an operation that causes the player's aircraft to climb steeply.

In this embodiment, the special command relating to the enemy ground object may cause the player's aircraft to be automatically moved along a maneuver flight path so that the determined positional relationship is achieved, and then cause the player's aircraft to climb steeply irrespective of the movement input information input by the player, taking account of an inexperienced player.

4.6. Suspension

In this embodiment, the game may be suspended based on input information (pause input information) that suspends the game in progress, and the special command may be executed when the special command input information input by the player has been received after the game has been suspended. This allows the player to suspend the game and check the state of the player's aircraft and the enemy aircraft.

Likewise, the game may be suspended based on input information that suspends the game in progress when receiving the maneuver input information, and the player's aircraft may be moved along the maneuver flight path when the maneuver input information input by the player has been received. This allows the player to carefully determine the maneuver flight path along which the player's aircraft is moved. When executing the special command upon reception of the maneuver input information, the game may be suspended in the same manner as described above, and the special command may be executed when the maneuver input information input by the player has been received.

4.7. Execution of Special Command

In this embodiment, the special command may be executed when the parameter of the special gauge has reached the maximum value irrespective of whether or not the special command input information has been received.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A program that is stored in a non-transitory computer-readable information storage medium and implements a shooting game in which a moving object shoots a target in an object space, the program causing a computer to function as:
a movement processing section that moves the moving object based on movement input information input by a player;
a reception section that receives special command input information input by the player when the moving object and the target have a predetermined positional relationship; and
a game calculation section that causes the moving object to fire a bullet based on shooting input information input by the player, determines whether or not the fired bullet has hit the target, and performs game calculations based on the determination result,
the movement processing section controlling the moving object to move to a moving position irrespective of the movement input information when the reception section has received the special command input information, the moving position being a position at which a fired bullet is capable of hitting the target when the moving object fires the bullet from the moving position, and
the reception section receiving the special command input information when the moving object is positioned within a specific area that has been set in the object space based on a position of the target, the specific area moving in the object space along with movement of the target.

2. The program as defined in claim 1, the program causing a computer to further function as:
a drawing section that generates a field-of-view image viewed from a virtual camera in the object space; and
a display control section that displays the field-of-view image, and displays a simplified image that shows a relationship between a position of the moving object and the specific area in a display region differing from a display region of the field-of-view image.

3. The program as defined in claim 1, the program causing a computer to further function as:
an accuracy rate determination section that determines an accuracy rate when a plurality of bullets have been fired based on a period of time in which the moving object and the target have maintained the predetermined positional relationship until the reception section receives the special command input information,
wherein the movement processing section determines the position to which the moving object is moved based on the determined accuracy rate when the reception section has received the special command input information.

4. The program as defined in claim 1, the program causing a computer to further function as:
an accuracy rate determination section that determines an accuracy rate when a plurality of bullets have been fired based on the positional relationship between the moving object and the target when the reception section receives the special command input information,
wherein the movement processing section determines the position to which the moving object is moved based on the determined accuracy rate when the reception section has received the special command input information.

5. The program as defined in claim 1, the program causing a computer to further function as:
a virtual camera control section that controls a virtual camera in the object space; and
a drawing section that generates a field-of-view image viewed from the virtual camera in the object space,
wherein the movement processing section calculates a moving path of the moving object based on the special command input information when the reception section has received the special command input information; and
wherein the virtual camera control section controls at least one of a position, a direction, and an angle of view of the virtual camera based on the moving path of the moving object.

6. A game system that implements a shooting game in which a moving object shoots a target in an object space and includes a hardware processor, the game system comprising:
a movement processing section that moves the moving object based on movement input information input by a player;
a reception section that receives special command input information input by the player when the moving object and the target have a predetermined positional relationship; and
a game calculation section that causes the moving object to fire a bullet based on shooting input information input by the player, determines whether or not the fired bullet has hit the target, and performs game calculations based on the determination result,
the movement processing section controlling the moving object to move to a moving position irrespective of the movement input information when the reception section has received the special command input information, the moving position being a position at which a fired bullet is capable of hitting the target when the moving object fires the bullet from the moving position, and the reception section receiving the special command input information when the moving object is positioned within a specific area that has been set in the object space based on a position of the target, the specific area moving in the object space along with movement of the target.

7. A movement control method that is used in a shooting game in which a moving object shoots a target in an object space and performed by a hardware processor, the movement control method comprising:

moving the moving object based on movement input information input by a player;

receiving special command input information input by the player when the moving object and the target have a predetermined positional relationship;

causing the moving object to fire a bullet based on shooting input information input by the player, determining whether or not the fired bullet has hit the target, and performing game calculations based on the determination result; and controlling the moving object to move to a moving position irrespective of the movement input information when the special command input information has been received, the moving position being a position at which a fired bullet is capable of hitting the target when the moving object fires the bullet from the moving position, and receiving the special command input information when the moving object is positioned within a specific area that has been set in the object space based on a position of the target, the specific area moving in the object space along with movement of the target.

* * * * *